United States Patent
Otaki et al.

(10) Patent No.: US 8,836,331 B2
(45) Date of Patent: Sep. 16, 2014

(54) VOLUME HOLOGRAM RESIN COMPOSITION, SURFACE RELIEF HOLOGRAM RESIN COMPOSITION, AND HOLOGRAM LAYER, HOLOGRAM TRANSFER FOIL AND BRITTLE HOLOGRAM LABEL USING THE SAME

(75) Inventors: Hiroyuki Otaki, Tokyo (JP); Kenji Ueda, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 257 days.

(21) Appl. No.: 13/209,513

(22) Filed: Aug. 15, 2011

(65) Prior Publication Data

US 2012/0032070 A1    Feb. 9, 2012

Related U.S. Application Data

(60) Continuation-in-part of application No. 12/851,913, filed on Aug. 6, 2010, now abandoned, which is a division of application No. 11/089,079, filed on Mar. 23, 2005, now abandoned.

(30) Foreign Application Priority Data

Mar. 25, 2004    (JP) .................. 2004-089685

(51) Int. Cl.
   *G01R 33/28*    (2006.01)
   *G03H 1/02*    (2006.01)
   *G03H 1/00*    (2006.01)
   *G07D 7/00*    (2006.01)
   *G07D 7/04*    (2006.01)

(52) U.S. Cl.
   CPC .............. *G03H 1/02* (2013.01); *G03H 2260/12* (2013.01); *G03H 2250/43* (2013.01); *G03H 1/0011* (2013.01); *G03H 2260/33* (2013.01); *G03H 1/0244* (2013.01); *G03H 2250/10* (2013.01); *G07D 7/0013* (2013.01); *G03H 2250/14* (2013.01); *G07D 7/04* (2013.01); *G03H 1/0256* (2013.01); *G03H 1/0248* (2013.01)
   USPC ......................................................... 324/316

(58) Field of Classification Search
   CPC ......................................................... G01R 33/28
   USPC .................................................. 324/300–322
   See application file for complete search history.

(56) References Cited

U.S. PATENT DOCUMENTS

| | | |
|---|---|---|
| 4,004,997 A | 1/1977 | Tsukamoto et al. |
| 4,684,795 A | 8/1987 | Colgate, Jr. |

(Continued)

FOREIGN PATENT DOCUMENTS

| | | |
|---|---|---|
| EP | 0 609 807 A2 | 8/1994 |
| JP | 04-283787 A | 10/1992 |

(Continued)

OTHER PUBLICATIONS

USPTO OA mailed Apr. 7, 2008 in connection with U.S. Appl. No. 11/089,079.

(Continued)

*Primary Examiner* — Dixomara Vargas
(74) *Attorney, Agent, or Firm* — Ladas & Parry LLP

(57) ABSTRACT

The major object of the invention is to provide a volume-type hologram resin composition and a surface relief-type hologram resin composition having a high effect of preventing forgery and excellent in foil cutting, as well as a hologram layer and a hologram transfer foil using thereof. To achieve the object, there is provided a volume-type hologram resin composition having at least one kind of photopolymerizable compound, a photopolymerization initiator and fine particles, wherein the fine particles show magnetic resonance.

11 Claims, 4 Drawing Sheets

(56) References Cited

U.S. PATENT DOCUMENTS

| | | | |
|---|---|---|---|
| 4,721,911 A * | 1/1988 | Neumann | 324/309 |
| 4,763,073 A * | 8/1988 | Turner | 324/312 |
| 4,801,392 A | 1/1989 | Adair et al. | |
| 4,856,857 A | 8/1989 | Takeuchi et al. | |
| 5,786,587 A | 7/1998 | Colgate, Jr. | |
| 5,986,550 A | 11/1999 | Rapaport et al. | |
| 6,066,378 A | 5/2000 | Morii et al. | |
| 6,236,493 B1 | 5/2001 | Schmidt et al. | |
| 6,677,086 B1 * | 1/2004 | Sutehrland et al. | 430/1 |
| 6,692,666 B2 * | 2/2004 | Sutherland et al. | 252/582 |
| 6,699,407 B1 * | 3/2004 | Sutehrland et al. | 252/582 |
| 6,821,592 B2 * | 11/2004 | Rodick | 428/40.1 |
| 6,855,760 B1 | 2/2005 | Kirsten et al. | |
| 6,878,494 B2 * | 4/2005 | Sutehrland et al. | 430/2 |
| 6,927,886 B2 * | 8/2005 | Plesniak et al. | 359/9 |
| 7,410,706 B2 * | 8/2008 | Rodick | 428/500 |
| 7,425,523 B2 * | 9/2008 | Ikemizu et al. | 503/218 |
| 7,521,155 B2 | 4/2009 | Otaki et al. | |
| 7,727,679 B2 * | 6/2010 | Kawaguchi et al. | 430/1 |
| 8,163,443 B2 * | 4/2012 | Tomari et al. | 430/2 |
| 8,430,872 B2 * | 4/2013 | Mardirossian et al. | 606/33 |
| 2003/0044547 A1 | 3/2003 | Krohn | |
| 2003/0124436 A1 | 7/2003 | Shioda et al. | |
| 2003/0134105 A1 | 7/2003 | Toshine et al. | |
| 2004/0009406 A1 | 1/2004 | Hesselink et al. | |
| 2004/0253521 A1 | 12/2004 | Otaki et al. | |
| 2005/0191560 A1 | 9/2005 | Otaki et al. | |
| 2006/0019172 A1 * | 1/2006 | Ohtaki et al. | 430/1 |
| 2006/0142419 A1 | 6/2006 | Xu et al. | |

FOREIGN PATENT DOCUMENTS

| | | |
|---|---|---|
| JP | 06-048075 A | 2/1994 |
| JP | 06-239071 A | 8/1994 |
| JP | 08-040723 A | 2/1996 |
| JP | 09-267559 A | 10/1997 |
| JP | 10-509815 T | 9/1998 |
| JP | 2000-272295 A | 10/2000 |
| JP | 2001-134728 A | 5/2001 |
| JP | 2001-315464 A | 11/2001 |
| JP | 2001-316998 A | 11/2001 |
| JP | 2002-093607 A | 3/2002 |
| JP | 2002-279370 A | 9/2002 |
| JP | 2003-168090 A | 6/2003 |
| JP | 2003-241625 A | 8/2003 |
| WO | 97/36726 A2 | 10/1997 |
| WO | 00/73398 A1 | 12/2000 |

OTHER PUBLICATIONS

USPTO OA mailed Dec. 31, 2008 in connection with U.S. Appl. No. 11/089,079.

USPTO OA mailed Aug. 3, 2009 in connection with U.S. Appl. No. 11/089,079.

* cited by examiner

VOLUME HOLOGRAM RESIN COMPOSITION, SURFACE RELIEF HOLOGRAM RESIN COMPOSITION, AND HOLOGRAM LAYER, HOLOGRAM TRANSFER FOIL AND BRITTLE HOLOGRAM LABEL USING THE SAME

BACKGROUND OF THE INVENTION

1. Field of the Invention

The present invention relates to a volume-type hologram resin composition and a surface relief-type hologram resin composition used in, for example, a hologram transfer foil etc., as well as a hologram layer, a hologram transfer foil and a fragile hologram label using thereof.

2. Description of the Related Art

A hologram is that wherein two lights (object light and reference light) having the same wavelength are allowed to interfere with each other and the wave front of the object light is recorded as an interference fringes on a photosensitive material. When a light of the same conditions as those of the original reference light is applied to this hologram, a diffraction phenomenon can occur by an interference fringes to regenerate the same wave front as the original object light. The hologram is classified into some kinds (surface relief-type hologram, volume-type hologram etc.) depending on the recording form of an interference fringes generated by interference of a laser light or a light excellent in coherence.

In recent years, the hologram has been used often in security fields because of its property of difficult reproduction of the same design. In this application, a surface relief-type hologram recording an interference fringes by forming a finely embossed pattern on the surface of a hologram-forming layer is generally used. However, due to distribution of holography technology and upgrading of forgery techniques, a surface relief-type hologram is imitated and reproduced sometimes at such a level that its forgery though recognized by specialists cannot recognized at first sight by laymen. Accordingly, when the hologram is used in application to security, countermeasures such as application of decorative techniques used in paper money and bonds to designs on the hologram and combination of such techniques with other printing techniques come to be necessary.

On the other hand, the volume-type hologram is produced by recording an interference fringes generated by interference of light, as bands different in refractive index three-dimensionally in the direction of thickness of a photosensitive material. This volume-type hologram is different in its production method from that of the surface relief-type hologram used widely at present and is completely different in visual effect, thus facilitating judgment of genuineness. Further, production facilities are expensive, and imitation of designs requires design techniques at high levels, and thus production of the hologram for the purpose of forgery is extremely difficult. Accordingly, there is a need for use of the volume-type hologram in application to security.

Though not concerned with hologram, a crime prevention system and an antitheft tag have been extensively developed in recent years wherein a commodity is provided with e.g. an antitheft tag for prevention of theft, and when the commodity is taken out from a store, the presence of the antitheft tag is detected by a detector to generate an alarm (for example, Japanese Patent Application Laid-Open (JP-A) No. 2003-168090, JP-A2001-315464). Mainly, a magnetic material is used in this antitheft tag, and the magnetic material reacts with e.g. an electromagnetic wave of resonant frequency generated by a detector arranged in an entrance of a store, and its signal is detected.

JP-A 2002-279370 proposes a forgery-preventing seal used in credit cards and gift certificates. This forgery-preventing seal has a substrate, a ferromagnetic substance layer and an adhesive layer, and a signal obtained by applying an alternating current magnetic field to a ferromagnetic substance contained in the ferromagnetic substance layer can be analyzed to judge genuineness.

U.S. Pat. No. 5,986,550 owned by Micro Tag Temed Ltd. proposes a method of certification or discrimination by utilizing a range of specific magnetic resonance phenomena. This is a method that involves adding e.g. a certifying substance to a credit card, a commodity or the like to certify and discriminate it by utilizing nuclear magnetic resonance or nuclear quadrupole resonance. Although U.S. Pat. No. 5,986,550 owned by Micro Tag Temed Ltd. discloses a method of certification and discrimination and an apparatus using this method and general application modes, it does not describe in detail some specific modes of the certifying substance application.

A hologram is not described in any of the methods described above.

SUMMARY OF THE INVENTION

The present invention was made in view of the aforementioned problem, and the major object of the present invention is to provide a volume-type hologram resin composition and a surface relief-type hologram resin composition having a high effect of preventing forgery and excellent in foil cutting, as well as a hologram layer, a hologram transfer foil and a fragile hologram label using thereof.

To achieve the object, the present invention provides a volume-type hologram resin composition having at least one kind of photopolymerizable compound, a photopolymerization initiator and fine particles, wherein the fine particles show magnetic resonance.

In the present invention, the fine particles contained in the volume-type hologram resin composition show magnetic resonance, so the presence of the fine particles can be recognized by utilizing the magnetic resonance phenomenon, and thus a hologram layer formed by using the volume-type hologram resin composition of the present invention can be used to judge genuineness easily. Further, whether the volume-type hologram resin composition itself is authentic or not can be judged, and thus the distribution of the hologram-forming material can be managed, and the effect of the hologram on prevention of forgery can be further improved. When the hologram layer formed by using the volume-type hologram resin composition of the present invention is used as hologram transfer foil, there is also an advantage that foil cutting upon adhesion of the hologram to an adherend is improved because the fine particles are contained in the volume-type hologram resin composition to confer fragility on the hologram layer. When the hologram layer formed by using the volume-type hologram resin composition of the present invention is used in a fragile hologram label, the fine particles are contained in the volume-type hologram resin composition to confer fragility on the hologram layer, so when the label is to be released from an adherend, the hologram layer is broken and to be not reusable, thus bringing about a further advantage of improving the forgery-preventing function.

In the present invention, the fine particles may show nuclear magnetic resonance or electron spin resonance. The fine particles are preferably a ferromagnetic substance, an antiferromagnetic substance or a ferrimagnetic substance. As disclosed in U.S. Pat. No. 5,986,550 owned by Micro Tag Temed Ltd., even in the absence of an external magnetic field, the ferromagnetic substance, antiferromagnetic substance and ferrimagnetic substance show specific magnetic properties with spins aligned in a specific direction, and by using nuclear magnetic resonance or electron spin resonance, the presence of the fine particles can be easily recognized to judge genuineness easily.

In the present invention, the average particle diameter of the fine particles is preferably smaller than the recording wavelength of the hologram. This is because when the average particle diameter of the fine particles is smaller than the recording wavelength of the hologram, the hologram can be formed without adversely affecting image information on the hologram.

In the present invention, the volume-type hologram resin composition preferably has a sensitizing dye. This is because the photopolymerizable compound and the photopolymerization initiator contained in the volume-type hologram resin composition are reactive mainly with UV light, and by adding the sensitizing dye, they become reactive with a visible light as well, to enable recording an interference fringes with a visible laser light.

In the present invention, the volume-type hologram resin composition has a binder resin. This is because when the volume-type hologram resin composition constituted as described above is used to form a hologram layer, film-forming properties and the uniformity of film thickness can be improved by adding the binder resin, to stabilize a recorded interference fringes.

Further, the present invention provides a surface relief-type hologram resin composition having a resin material and fine particles, wherein the fine particles show magnetic resonance.

In the present invention, the presence of the fine particles can be recognized by utilizing the magnetic resonance phenomenon as described above, and thus a hologram layer formed by using the surface relief-type hologram resin composition of the present invention can be used to judge genuineness easily. Further, whether the surface relief-type hologram resin composition itself is authentic or not can be judged, and thus the distribution of the hologram-forming material can be managed, and the effect of the hologram on prevention of forgery can be further improved. When the hologram layer formed by using the surface relief-type hologram resin composition of the present invention is used as hologram transfer foil, there is also an advantage that foil cutting upon adhesion of the hologram to an adherend is improved because the fine particles are contained in the surface relief-type hologram resin composition to confer fragility on the hologram layer. When the hologram layer formed by using the surface relief-type hologram resin composition of the present invention is used in a fragile hologram label, the fine particles are contained in the volume-type hologram resin composition to confer fragility on the hologram layer, so when the label is to be released from an adherend, the hologram layer is broken and not reusable, thus bringing about a further advantage of improving the forgery-preventing function.

In the present invention, the fine particles may show nuclear magnetic resonance or electron spin resonance. The fine particles are preferably a ferromagnetic substance, an antiferromagnetic substance or a ferrimagnetic substance. As disclosed in U.S. Pat. No. 5,986,550 owned by Micro Tag Temed Ltd., even in the absence of an external magnetic field, the ferromagnetic substance, antiferromagnetic substance and ferrimagnetic substance show specific magnetic properties with spins aligned in a specific direction, and by using nuclear magnetic resonance or electron spin resonance, the presence of the fine particles can be easily recognized to judge genuineness easily.

In the present invention, the average particle diameter of the fine particles is preferably smaller than the recording wavelength of the hologram. This is because when the average particle diameter of the fine particles is smaller than the recording wavelength of the hologram, the hologram can be formed without adversely affecting image information on the hologram.

Further, the present invention provides a hologram layer formed by using the volume-type hologram resin composition or the surface relief-type hologram resin composition.

According to the present invention, the hologram layer is formed by using the volume-type hologram resin composition or the surface relief-type hologram resin composition, and thus the hologram layer can have a high effect of preventing forgery.

The present invention also provide a hologram transfer foil using the hologram layer described above, which comprises a substrate film, the hologram layer formed on the substrate film, and a heat-sensitive adhesive layer formed on the hologram layer.

According to the present invention, the hologram transfer foil has the hologram layer described above, can thus be used as a hologram transfer foil having a high effect of preventing forgery and excellent in foil cutting, and can be used in various applications.

The present invention also provides a fragile hologram label using the hologram layer described above, which comprises an adhesive layer, the hologram layer formed on the adhesive layer, and a surface protective layer formed on the hologram layer. According to the present invention, the fragile hologram label has the hologram layer described above, can thus be used as a hologram label having an effect of preventing forgery and being hardly releasable and fragile because of its contained fine particles, and can be used in various applications.

In the present invention, the presence of the fine particles can be recognized by utilizing the magnetic resonance phenomenon, and thus a hologram layer having a high effect of preventing forgery can be obtained by using the hologram resin composition of the present invention. Further, whether the hologram resin composition itself is authentic or not can be judged, and the distribution of the hologram-forming material can be managed, and thus the effect of the hologram on prevention of forgery can be further improved. When the hologram layer formed by using the hologram resin composition of the present invention is used as hologram transfer foil, there is brought about an effect of improving foil cutting upon adhesion of the hologram to an adherend because the hologram layer has been endowed with fragility by the fine particles. When the hologram layer formed by using the hologram resin composition of the present invention is used as a fragile hologram label, the hologram layer has been endowed with fragility by the fine particles, and thus when the label is to be released from an adherend, the hologram layer is broken and to be not reusable, thus bringing about a further effect of improving the forgery preventing function.

DESCRIPTION OF THE PREFERRED EMBODIMENT

Figure 1:
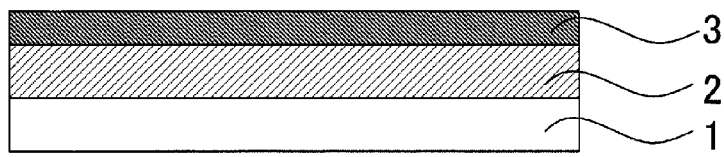
FIG. 1 is a schematic sectional view showing one example of the hologram transfer foil of the present invention.

Hereinafter, the volume-type hologram resin composition and surface relief-type hologram resin composition of the present invention, as well as a hologram layer, a hologram transfer foil and a fragile hologram label using thereof are described in detail.

A. Volume-Type Hologram Resin Composition

First, the volume-type hologram resin composition of the present invention is described.

The volume-type hologram resin composition of the present invention has at least one kind of photopolymerizable compound, a photopolymerization initiator and fine particles, wherein the fine particles show magnetic resonance.

In the present invention, the fine particles contained in the volume-type hologram resin composition show magnetic resonance, so upon irradiation with e.g. an electromagnetic wave of resonant frequency from a magnetic resonance unit, the fine particles show resonance therewith to absorb energy, and thus the presence of the fine particles can be recognized by observing this absorption. Accordingly, a hologram layer formed by using the volume-type hologram resin composition of the present invention can be used to judge genuineness easily. Further, whether the volume-type hologram resin composition itself is authentic or not can be judged, and thus the distribution of the hologram-forming material can be managed, and the effect of the hologram on prevention of forgery can be further improved. When the hologram layer formed by using the volume-type hologram resin composition of the present invention is used as hologram transfer foil, there is also an advantage that foil cutting upon adhesion of the hologram to an adherend is improved because the fine particles are contained in the volume-type hologram resin composition to confer fragility on the hologram layer.

Hereinafter, the constitution of each of the volume-type hologram resin materials is described.

1. Fine Particles

The fine particles used in the present invention are described in detail. The fine particles used in the present invention show magnetic resonance.

As used herein, "magnetic resonance" is a generic name of nuclear magnetic resonance (NMR), nuclear quadrupole resonance (NQR), electron spin resonance (ESR), ferromagnetic resonance, antiferromagnetic resonance, ferrimagnetic resonance, magnetic wall resonance, spin wave resonance, spin echo resonance etc. General mechanisms of some specific magnetic resonance phenomena are described in U.S. Pat. No. 5,986,550 owned by Micro Tag Temed Ltd. For example, nuclear magnetic resonance (NMR) refers to a phenomenon wherein a nuclear spin is split in two energy states by the Zeeman effect upon application of an external magnetic field to an atomic nucleus, and shows resonance upon irradiation of an electromagnetic wave of frequency (resonant frequency) corresponding to a difference in energy between the two energy states. Electron spin resonance (ESR) refers to a phenomenon wherein a nuclear spin is split in two energy states by the Zeeman effect upon application of an external magnetic field to an unpaired electron, and shows resonance upon irradiation of an electromagnetic wave of frequency (resonant frequency) corresponding to a difference in energy between the two energy states. Depending on the electron spin of a substance used, magnetic resonance can be classified into ferromagnetic resonance, antiferromagnetic resonance, ferrimagnetic resonance etc. For example, ferromagnetic resonance refers to the electron spin resonance of a ferromagnetic substance.

The resonant frequency is determined by gyromagnetic ratio $\gamma$ as a parameter inherent in nucleus and the strength of an external magnetic field, and thus the resonant frequency at which the fine particles used in the present invention show magnetic resonance can be selected in recognition of the presence of the fine particles and in judgment of genuineness.

For example, when a volume-type hologram resin composition containing fine particles showing nuclear magnetic resonance and a volume-type hologram resin composition not containing fine particles showing nuclear magnetic resonance are irradiated with an electromagnetic wave of frequency at which the fine particles show nuclear magnetic resonance, resonance absorption occurs in the volume-type hologram resin composition containing the fine particles, while resonance absorption does not occur in the volume-type hologram resin composition not containing the fine particles, and thus by measuring this resonance absorption, the presence of the fine particles can be recognized to judge genuineness. NMR spectrums obtained are different in position, strength, half width and shape depending on the structure and energy states of a substance, etc., and thus depending on the type of the fine particles used, the volume-type hologram resin composition of the present invention can also be discriminated.

The fine particles used in the present invention are not particularly limited insofar as they exhibit magnetic resonance and do not affect formation of an image on a hologram using a hologram layer formed by using the volume-type hologram resin composition of the present invention. However, the fine particles are preferably materials such as those disclosed in U.S. Pat. No. 5,986,550 owned by Micro Tag Temed Ltd. More specifically, the fine particles are preferably materials showing magnetic resonance at radio frequency or in a frequency band of microwaves. In this case, the radio frequency shall be usually in the range of 1 MHz to 1 GHz.

The fine particles used in the present invention are preferably those showing magnetic resonance in a very weak external magnetic field of about 1 mT or less, more preferably those showing magnetic resonance even in the absence of an external magnetic field. This is because resonance absorption can be measured by irradiating the fine particles with an electromagnetic wave of resonant frequency without applying a strong external field, thus preventing problems such as possible influence on the human body or disappearance of data in a magnetic recording medium. These fine particles are also advantageous in that genuineness can be judged by a simple detector. In the present invention, the absence of an external magnetic field means that the external magnetic field is zero, or the external magnetic field if present is as very low as the terrestrial magnetic field (0.5 mT).

The fine particles used in the present invention preferably show the above magnetic resonance at room temperature. For example, when the fine particles show magnetic resonance at ultra-low temperatures or ultra-high temperatures, special cooling for ultra-low temperatures or special heating for ultra-high temperatures is necessary, and thus a device for detecting the fine particles is complicated and disadvantageous in costs. As used in the present invention, room temperature means a temperature range in a usual working atmosphere, for example −20° C. to 50° C.

Such fine particles are preferably those having the above-described properties, more preferably those showing nuclear magnetic resonance (NMR) and/or electron spin resonance (ESR). This is because such magnetic resonance is applied widely to medical instruments and a certification system, and is thus easily applied to the present invention.

The fine particles showing nuclear magnetic resonance (NMR) are not particularly limited insofar as they have an atom having an atomic nucleus whose nuclear spin quantum number I is not zero, and the fine particles are more preferably a ferromagnetic substance, an antiferromagnetic substance or a ferrimagnetic substance.

The ferromagnetic substance is a substance having adjacent spins aligned in the same direction and having a great magnetic moment as a whole, and has spontaneous magnetization even in the absence of an external magnetic field. The antiferromagnetic substance is a substance having adjacent spins aligned in an opposite direction and not having a magnetic moment as a whole. The ferrimagnetic substance has at least two kinds of ions having anti-parallel spins and different in magnification from one another, and thus has magnetization as a whole.

Thus, the ferromagnetic substance, antiferromagnetic substance and ferrimagnetic substance have spins aligned in a specific direction without an external field, and show specific magnetic properties, and thus the presence of the fine particles can be recognized by utilizing nuclear magnetic resonance, to enable easy judgment of genuineness.

The ferromagnetic substance showing nuclear magnetic resonance is not particularly limited insofar as it can be used as fine particles, and the ferromagnetic substance may be crystalline or amorphous. The ferromagnetic substance may be an inorganic or organic compound. Such ferromagnetic substance can include, for example, ferromagnetic metal elements such as iron (Fe), cobalt (Co), nickel (Ni) and gadolinium (Gd), ferromagnetic metal-containing alloys, and ferromagnetic metal oxides. Specifically, the ferromagnetic metal-containing alloys include Fe—Co, Fe—Ni, Fe—Co—Ni, Co—Ni, Fe—Mn—Zn, Fe—Ni—Zn, Fe—Co—Ni—Cr, Fe—Co—Ni—P, Fe—Co—B, Fe—Co—Cr—B, Fe—Co—V, and alloys of a ferromagnetic metal element and lanthanoid such as Sm, Nd or the like. For the purpose of conferring or improving various characteristics, elements such as Al, Si, Ti, Cr, Mn, Mg, P, B, C, S, V, Cu, Zn, Y, Zr, Nb, Mo, Pd, Ag, In, Sn, Ta, W, Ir, Pd, Au and Pd can be added to the ferromagnetic metal element, alloys and oxides. As the organic ferromagnetic substance, amorphous carbon doped with lithium described in JP-A 5-166622 or $C_{60}$ complexes and the like can be used.

The antiferromagnetic substance showing nuclear magnetic resonance is not particularly limited insofar as it can be used as fine particles, and the antiferromagnetic substance may be crystalline or amorphous. The antiferromagnetic substance may be an inorganic or organic compound. Such antiferromagnetic substance can include, for example, compounds represented by the general formula $(FeMn)_{100-x}A_x$. In the formula, A is at least one element selected from the group consisting of Ru, Rh, Pt, Ir, Ti, Zr, Hr, V, Nb, Ta, Cr, Mo, W, Ni and Cu. x satisfies the relationship $0 \leq x \leq 12$. Monoxides of transition metals such as Mn, Fe, Co and Ni can also be used.

The ferrimagnetic substance showing nuclear magnetic resonance is not particularly limited insofar as it can be used as fine particles, and the ferrimagnetic substance may be crystalline or amorphous. The ferrimagnetic substance may be an inorganic or organic compound. Such ferrimagnetic substance includes, for example, ferrite compounds, specifically compounds represented by the general formula $MFe_2O_4$. In the formula, M is a divalent metal element such as Mn, Fe, Co, Ni, Cu, Zn, Ba or the like. The compound represented by the above formula can include, for example, nickel ferrite ($NiFe_2O_4$), cobalt ferrite ($CoFe_2O_4$), magnetite ($Fe_3O_4$), and the barium ferrite ($BaFe_2O_4$) described in JP-A 8-40723. Fine particles of a complex of metal iron and nickel/zinc/iron ferrite described in JP-A 2002-93607 can also be used.

On one hand, the fine particles showing electron spin resonance (ESR) are not particularly limited insofar as they have an unpaired electron, and particularly the fine particles are preferably a paramagnetic substance, a ferromagnetic substance, an antiferromagnetic substance or a ferrimagnetic substance. As described above, the ferromagnetic substance, antiferromagnetic substance and ferrimagnetic substance show specific magnetic characteristics with spins aligned in a specific direction, and by using their electron spin resonance, the presence of the fine particles can be easily recognized, thus enabling easy judgment of genuineness.

The paramagnetic substance showing electron spin resonance is not particularly limited insofar as it can be used as fine particles, and the paramagnetic substance may be crystalline or amorphous. The paramagnetic substance may be an inorganic or organic compound. Such paramagnetic substance includes, for example, nitroxide type compounds such as phenyl nitroxide or its derivatives, organic radical compounds such as recrystallized diphenyl picryl hydrazyl, ion radical salts and lithium phthalocyanine, and gamma ray-irradiated molten quartz.

The ferromagnetic substance showing electron spin resonance is not particularly limited insofar as it can be used as fine particles, and the ferromagnetic substance may be crystalline or amorphous. The ferromagnetic substance may be an inorganic or organic compound. As the ferromagnetic substance, the above-mentioned ferromagnetic substance showing nuclear magnetic resonance can be used.

The antiferromagnetic substance showing electron spin resonance is not particularly limited insofar as it can be used as fine particles, and the antiferromagnetic substance may be crystalline or amorphous. The antiferromagnetic substance may be an inorganic or organic compound. As the antiferromagnetic substance, the above-mentioned antiferromagnetic substance showing nuclear magnetic resonance can be used.

The ferrimagnetic substance showing electron spin resonance is not particularly limited insofar as it can be used as fine particles, and the ferrimagnetic substance may be crystalline or amorphous. The ferrimagnetic substance may be an inorganic or organic compound. Such ferrimagnetic substance includes, for example, inorganic salts or coordination compounds containing paramagnetic ion of transition metal or rare earth metal. The above-mentioned ferrimagnetic substance showing nuclear magnetic resonance, for example the ferrite compound etc. may also be used.

In the present invention, the average particle diameter of the fine particles is preferably smaller than the wavelength (recording wavelength) of a laser light or the like used in recording a hologram image. This is because when the average particle diameter of the fine particles is greater than the recording wavelength, there are cases where formation of a hologram image is adversely affected. When a color hologram for example is produced, fine particles having an average particle diameter smaller than the shortest wavelength among the recording wavelengths used may be selected. That is, the fine particles may be used after the average particle diameter is suitably selected depending on the recording wavelength used.

Specifically, the average particle diameter of the fine particles is preferably in the range of 50 nm to 700 nm, particularly in the range of 50 nm to 400 nm. This is because fine particles having an average particle diameter smaller than the range described above are hardly produced, and a hologram layer formed by using the volume-type hologram resin composition of the present invention is hardly endowed with fragility. On the other hand, when the average particle diameter of the fine particles is too large, formation of a hologram image may be adversely affected.

The average particle diameter is used to indicate the particle diameter of particles generally, and in the present invention, it is a value determined by a laser method. The laser method is a method wherein particles are dispersed in a solvent, their dispersing solvent is irradiated with a laser light, and the resulting scattered light is captured and calculated to determine the average particle diameter, particle size distribution etc. The average particle diameter is a value determined by using, as an instrument for measuring particle diameter by a laser method, a particle size analyzer Microtruck UPA Model-9230 manufactured by Leeds & Northrup.

The fine particles may be contained in the range of 1 to 30 wt %, preferably 5 to 20 wt %, in the volume-type hologram resin composition. When the content of the fine particles is too low, a hologram layer formed by using the volume-type hologram resin composition of the present invention may not be endowed with sufficient fragility for use as hologram transfer foil. On the other hand, when the content of the fine particles is too high, the strength and transparency of the resulting hologram layer may be hardly maintained.

2. Photopolymerizable Compound

Now, the photopolymerizable compound used in the present invention is described. The photopolymerizable compound may be a photo-radical-polymerizable compound or a photo-cationic-polymerizable compound. Hereinafter, the photo-radical-polymerizable compound and photo-cationic-polymerizable compound are described respectively.

(1) Photo-Radical-Polymerizable Compound

The photo-radical polymerizable compound used in the present invention is not particularly limited insofar as it is a compound polymerizable by the action of an active radical generated from a photo-radical-polymerization initiator described later, for example upon laser irradiation in order to form a hologram from the volume-type hologram resin composition of the present invention, and a compound having at least one addition-polymerizable ethylenically unsaturated double bond can be used. For example, unsaturated carboxylic acids, unsaturated carboxylates, esters of an unsaturated carboxylic acid and an aliphatic polyhydric alcohol compound, and compounds comprising an unsaturated carboxylic acid bound via an amide linkage to an aliphatic polyvalent amine compound etc. can be used. Specific examples of monomers of the esters of an unsaturated carboxylic acid and an aliphatic polyhydric alcohol compound are shown below.

The acrylate includes ethylene glycol diacrylate, triethylene glycol diacrylate, 1,3-butane diol diacrylate, tetramethylene glycol diacrylate, propylene glycol diacrylate, neopentyl glycol diacrylate, trimethylol propane triacrylate, trimethylol propane tri(acryloyloxypropyl)ether, trimethylol ethane triacrylate, hexane diol diacrylate, 1,4-cyclohexane diol diacrylate, tetraethylene glycol diacrylate, pentaerythritol diacrylate, pentaerythritol triacrylate, pentaerythritol tetracrylate, dipentaerythritol diacrylate, dipentaerythritol triacrylate, dipentaerythritol tetracrylate, dipentaerythritol hexacrylate, sorbitol triacrylate, sorbitol tetracrylate, sorbitol pentacrylate, sorbitol hexacrylate, tri(acryloyloxyethyl)isocyanurate, polyester acrylate oligomers, 2-phenoxyethyl acrylate, phenol ethoxylate monoacrylate, 2-(p-chlorophenoxy)ethyl acrylate, p-chlorophenyl acrylate, phenyl acrylate, 2-phenyl ethyl acrylate, (2-acryloxyethyl)ether of bisphenol A, ethoxylated bisphenol A diacrylate, 2-(1-naphthyloxy)ethyl acrylate, o-biphenyl acrylate, 9,9-bis(4-acryloxydiethoxyphenyl)fluorene, 9,9-bis(4-acryloxytriethoxyphenyl)fluorene, 9,9-bis(4-acryloxydipropoxyphenyl)fluorene, 9,9-bis(4-acryloxyethoxy-3-methylphenyl)fluorene, 9,9-bis(4-acryloxyethoxy-3-ethylphenyl)fluorene, and 9,9-bis(4-acryloxyethoxy-3,5-dimethyl)fluorene.

Sulfur-containing acrylic compounds described in JP-A 61-72748 can also be used. For example, 4,4'-bis(β-acryloyloxyethylthio)diphenyl sulfone, 4,4'-bis(β-acryloyloxyethylthio)diphenyl ketone, 4,4'-bis(β-acryloyloxyethylthio) 3,3', 5,5'-tetrabromodiphenyl ketone, 2,4-bis(β-acryloyloxyethylthio)diphenyl ketone etc. can be used.

The methacrylate is exemplified by compounds wherein in the compounds mentioned above as the acrylate, "acrylate" is converted into "methacrylate" and "acryloyl" into "methacryloyl".

The photo-radical-polymerizable compounds may be used alone or as a mixture of two or more thereof.

(2) Photo-Cationic-Polymerizable Compound

The photo-cationic-polymerizable compound used in the present invention is a compound which is cationic-polymerizable with Brφnsted acid or Lewis acid generated by decomposition of a photo-cationic-polymerization initiator described later upon irradiation with energy. For example, cyclic ethers having an epoxy ring, an oxetane ring or the like, thioethers, and vinyl ethers etc. can be used.

The epoxy ring-containing compound is exemplified by polyalkylene glycol diglycidyl ether, bisphenol A diglycidyl ether, glycerin triglycidyl ether, diglycerol triglycidyl ether, diglycidyl hexahydrophthalate, trimethylol propane diglycidyl ether, allyl glycidyl ether, phenyl glycidyl ether, cyclohexene oxide etc.

These photo-cationic-polymerizable compounds may be used alone or as a mixture of two or more thereof.

The photo-radical-polymerizable compounds and the photo-cationic-polymerizable compounds may be used alone or as a mixture of two or more thereof.

When a hologram is formed by using the volume-type hologram recording resin composition using the photo-radical-polymerizable compound in combination with the photo-cationic-polymerizable compound, a laser is used in irradiation along an objective image to polymerize the photo-radical-polymerizable compound, and then the whole surface is irradiated with energy thereby polymerizing the uncured material such as the photo-cationic-polymerizable compound etc. The laser for forming an image and the energy used in irradiating the whole surface are usually those different in wavelength, and the photo-cationic-polymerizable compound used in the present invention is preferably a compound not polymerized with a laser etc. forming an image.

The photo-cationic-polymerizable compound is preferably in a liquid form at ordinary temperatures because it is preferable that polymerization of the photo-radical-polymerizable compound is conducted in the composition of relatively low viscosity.

(3) Others

The photopolymerizable compound used in the present invention may be used in an amount of 10 to 1000 parts by weight, preferably 10 to 300 parts by weight, based on 100 parts by weight of a binder resin described later.

In the volume-type hologram, the photopolymerizable compound is polymerized with e.g. a laser light or a light excellent in coherence to form an interference fringes to form an image. Accordingly, when the photo-radical-polymerizable compound and the photo-cationic-polymerizable compound are contained in the volume-type hologram resin composition, the two are those different in refractive index and either compound may have a higher refractive index. In the present invention, it is preferable from the viewpoint of material selectivity that the average refractive index of the photo-radical-polymerizable compound is greater than that of the photo-cationic-polymerizable compound, and specifically the average refractive index of the photo-radical-polymerizable compound is preferably greater by 0.02 or more. This is because when the difference in average refractive index between the photo-radical-polymerizable compound and the photo-cat ionic-polymerizable compound is lower than the above value, modulation of the refractive index is insufficient, and a highly minute image may be hardly formed. As used herein, the average refractive index refers to the average refractive index determined by measuring a polymer after polymerization of the photo-cationic-polymerizable compound or the photo-radical-polymerizable compound. The refractive index in the present invention is a value measured by an Abbe refractometer.

3. Photopolymerization Initiator

Now, the photopolymerization initiator used in the present invention is described. The type of the photopolymerization initiator used in the present invention varies depending on the photopolymerizable compound described above. That is, when the photo-polymerizable compound is a photo-radical-polymerizable compound, a photo-radical-polymerization initiator should be selected as the photopolymerization initiator, while when the photo-polymerizable compound is a photo-cationic-polymerizable compound, a photo-cationic-polymerization initiator should be selected as the photopolymerization initiator. Hereinafter, the photo-radical-polymerization initiator and the photo-cationic-polymerization initiator are described respectively.

(1) Photo-Radical-Polymerization Initiator

The photo-radical-polymerization initiator used in the present invention is not particularly limited insofar as it is an initiator capable of forming an active radical with, for example, a laser applied in formation of a hologram layer using the volume-type hologram resin composition of the present invention, to polymerize the photo-radical-polymerizable compound. For example, it is possible to use imidazole derivatives, bisimidazole derivatives, N-aryl glycine derivatives, organic azide compounds, titanocene derivatives, aluminate complexes, organic peroxides, N-alkoxy pyridinium salts, thioxanthone derivatives etc. Specific examples include 1,3-di(t-butyldioxycarbonyl)benzophenone, 3,3',4,4'-tetrakis (t-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethan-1-one (trade name: IRGACURE 651, manufactured by Chiba Speciality Chemicals), 1-hydroxy-cyclohexyl-phenyl-ketone (trade name: IRGACURE 184, manufactured by Chiba Speciality Chemicals), 2-benzyl-2-dimethylamino-1-(4-morpholinophenyl)-1-butanone-1 (trade name: IRGACURE 369, manufactured by Chiba Speciality Chemicals), and bis($\eta^5$-2, 4-cyclopentadien-1-yl)-bis(2,6-difluoro-3-(1H-pyrrol-1-yl)-phenyl) titanium (trade name: IRGACURE 784, manufactured by Chiba Speciality Chemicals).

(2) Photo-Cationic-Polymerization Initiator

The photo-cationic-polymerization initiator used in the present invention is not particularly limited insofar as it generates Br$\phi$nsted acid or Lewis acid upon irradiation with energy to polymerize the photo-cationic-polymerizable compound. When the volume-type hologram resin composition contains a photo-radical-polymerizable compound and a photo-cationic-polymerizable compound, it is preferable that the photo-cationic-polymerizable compound does not react with a laser or a light excellent in coherence for particularly polymerizing the above-mentioned photo-radical-polymerizable compound, but is sensitized with energy applied later onto the whole surface. This is because in the polymerization of the photo-radical-polymerizable compound, the photo-cationic-polymerizable compound hardly reacts and can be present as it is, to give significant modulation of refractive index in the volume-type hologram.

Specific examples include sulfonate, imide sulfonate, dialkyl-4-hydroxy sulfonium salt, p-nitrobenzyl aryl sulfonate, silanol/aluminum complex, ($\eta^6$-benzene) ($\eta^5$-cyclopentadienyl) iron (II), etc. Further, benzoin tosylate, 2,5-dinitrobenzyl tosylate, N-tosyphthalic acid imide etc. can also be used.

(3) Others

In the present invention, other materials serving as both a photo-radical-polymerization initiator and a photo-cationic-polymerization initiator are exemplified by aromatic iodonium salts, aromatic sulfonium salts, aromatic diazonium salts, aromatic phosphonium salts, triazine compounds, iron/allene complexes etc. Specific examples include iodonium chlorides or bromides of iodonium such as diphenyl iodonium, ditolyl iodonium, bis(p-t-butylphenyl)iodonium or bis (p-chlorophenyl)iodonium, iodonium salts of borofluorides, hexafluorophosphate and hexafluoroantimonate; chlorides or bromides of sulfonium such as triphenyl sulfonium, 4-t-butyl triphenyl sulfonium or tris(4-methylphenyl)sulfonium, sulfonium salts of borofluorides, hexafluorophosphate and hexafluoroantimonate; and 2,4,6-substituted-1,3,5-triazine compounds such as 2,4,6-tris(trichloromethyl)-1,3,5-triazine, 2-phenyl-4,6-bis(trichloromethyl)-1,3,5-triazine and 2-methyl-4,6-bis(trichloromethyl)-1,3,5-triazine.

The photopolymerization initiator described above may be used alone or as a mixture of two or more thereof.

The photopolymerization initiator may be used in an amount of 0.1 to 20 parts by weight, preferably 5 to 15 parts by weight, relative to 100 parts by weight of a binder resin described later.

4. Additives

Now, additives which can be added to the volume-type hologram resin composition of the present invention are described.

(1) Sensitizing Dye

In the present invention, the volume-type hologram resin composition preferably contains a sensitizing dye. This is because many photopolymerizable compounds and photopolymerization initiators described above are active to UV light, but can, upon addition of a sensitizing dye, be rendered also active to a visible light to enable recording of an interference fringes with a visible laser light.

Such sensitizing dye is selected in consideration of the wavelength of a laser light used in recording of an interference fringes, but is not particularly limited. For example, it is possible to use thiopyrylium salt-based dyes, merocyanine-based dyes, quinoline-based dyes, styryl quinoline-based dyes, coumarin-based dyes, ketocoumarin-based dyes, thioxanthene-based dyes, xanthene-based dyes, oxonol-based dyes, cyanine-based dyes, rhodamine-based dyes, pyrylium-based dyes, cyclopentanone-based dyes and cyclohexanone-based dyes.

The cyanine-based dyes and merocyanine-based dyes include 3,3'-dicarboxyethyl 2,2'-thiocyanine bromide, 1-carboxymethyl-1'-carboxyethyl-2,2'-quinocyanine bromide, 1,3'-diethyl-2,2'-quinothiacyanine iodide, 3-ethyl-5-[(3-ethyl-2 (3H)-benzothiazolylidene) ethylidene]-2-thioxo-4-oxazolidine etc.

The coumarin-based dyes and ketocoumarin-based dyes include 3-(2'-benzoimidazol)7-N,N-diethyl aminocoumarin, 3,3'-carbonyl bis(7-diethylaminocoumarin), 3,3'-carbonyl biscoumarin, 3,3'-carbonyl bis(5,7-dimethoxycoumarin), 3,3'-carbonyl bis(7-acetoxycoumarin), etc.

The sensitizing dye having an absorption wavelength in the visible light range requires high transparency in application of the hologram to an optical element, and in this case, the sensitizing dye is preferably a dye to be decomposed to turn colorless upon heating or irradiation with UV light in a later step after recording of an interference fringes. As such sensitizing dye, the above-mentioned cyanine-based dye is preferably used.

The sensitizing dye may be used in an amount of 0.01 to 10 parts by weight, preferably 0.01 to 2 parts by weight, based on 100 parts by weight of a binder resin described below.

(2) Binder Resin

In the present invention, the volume-type hologram resin composition preferably contains a binder resin. By incorporating the binder resin, film-forming properties and the uniformity of film thickness can be improved, and a recorded interference fringes can be stably present.

The binder resin can include polymethacrylate or its partial hydrolysate, polyvinyl acetate or its hydrolysate, polyvinyl alcohol or its partial acetal derivative, triacetyl cellulose, polyisoprene, polybutadiene, polychloroprene, silicone rubber, polystyrene, polyvinyl butyral, polyvinyl chloride, polyarylate, chlorinated polyethylene, chlorinated polypropylene, poly-N-vinyl carbazole or its derivative, poly-N-vinyl pyrrolidone or its derivative, a styrene/maleic anhydride copolymer or its half ester. It is also possible to use a copolymer produced by copolymerizing at least one kind of monomer selected from the group consisting of copolymerizable monomers such as acrylic acid, acrylate, methacrylic acid, methacrylate, acrylamide, acrylonitrile, ethylene, propylene, vinyl chloride and vinyl acetate. A copolymer produced by polymerizing monomers having a thermosetting or photosetting functional group in their side chain can also be used. Further, a mixture of two or more copolymers can also be used.

As the binder resin, an oligomer type curing resin can also be used. Examples include epoxy compounds etc. formed by condensation reaction of epichlorohydrin with various kinds of phenol compounds such as bisphenol A, bisphenol S, novolak, o-cresol novolak and p-alkyl phenol novolak.

As the binder resin, an organic/inorganic hybrid polymer utilizing sol-gel reaction can also be used. For example, a copolymer of an organometallic compound having a polymerizable group represented by the following general formula (1) and a vinyl monomer can be mentioned.

$$R_m M(OR')_n \quad (1)$$

wherein M represents a metal such as Si, Ti, Zr, Zn, In, Sn, Al or Se, R represents a C1 to C10 vinyl group or a (meth)acryloyl group, R' represents a C1 to C10 alkyl group, and m+n is the valence of metal M.

Examples of the organometallic compound where Si is used as the metal M include vinyl triethoxy silane, vinyl trimethoxy silane, vinyl tributoxy silane, vinyl triallyloxy silane, vinyl tetraethoxy silane, vinyl tetramethoxy silane, acryloxy propyl trimethoxy silane, methacryloxy propyl trimethoxy silane, etc.

The vinyl monomer includes acrylic acid, acrylate, methacrylic acid, methacrylate, etc.

The volume-type hologram is a hologram wherein an interference fringes is recorded and formed as refractive index modulation or transmittance modulation. Accordingly, the difference in refractive index between the binder resin and the photopolymerizable compound is preferably greater. In the present invention, an organometallic compound represented by the following general formula (2) can be added to the volume-type hologram resin composition in order to increase the difference in refractive index between the binder resin and the photopolymerizable compound.

$$M'(OR'')_k \quad (2)$$

wherein M represents a metal such as Ti, Zr, Zn, In, Sn, Al or Se, R'' represents a C1 to C10 alkyl group, and k is the valence of metal M.

When the compound represented by the formula (2) is added to the volume-type hologram resin composition, the compound forms a network structure with the binder resin by sol-gel reaction in the presence of water and an acid catalyst, thus bringing about not only an effect of increasing the refractive index of the binder resin but also an effect of improving the rigidity and heat resistance of the resulting film. Accordingly, the metal M' used is preferably the one having high refractive index in order to increase the difference in refractive index from the photopolymerizable compound.

The binder resin is used usually in the range of 15 to 50 wt %, preferably in the range of 20 to 40 wt %, in the volume-type hologram resin composition.

B. Surface Relief-Type Hologram Resin Composition

Now, the surface relief-type hologram resin composition of the present invention is described.

The surface relief-type hologram resin composition of the present invention has a resin material and fine particles, wherein the fine particles show magnetic resonance.

In the present invention, the fine particles contained in the surface relief-type hologram resin composition show magnetic resonance, so upon irradiation with e.g. an electromagnetic wave of resonant frequency from a magnetic resonance unit, the fine particles show resonance therewith to absorb energy, and thus the presence of the fine particles can be recognized by observing this absorption. Accordingly, a hologram layer formed by using the surface relief-type hologram resin composition of the present invention has an advantage of easy judgment of genuineness. Further, whether the surface relief-type hologram resin composition itself is authentic or not can be judged, and thus the distribution of the hologram-forming material can be managed, and the effect of the hologram on prevention of forgery can be further improved. When the hologram layer formed by using the surface relief-type hologram resin composition of the present invention is used as hologram transfer foil, there is also an advantage that foil cutting upon adhesion of the hologram to an adherend is improved because the fine particles are contained in the surface relief-type hologram resin composition to confer fragility on the hologram layer.

Hereinafter, the constitution of each of the materials in the surface relief-type hologram resin composition is described. A description of the constitution of the fine particles is omitted because it is the same as described above in "A. Volume-type hologram resin composition".

1. Resin Material

Now, the resin material used in the present invention is described. By incorporating the resin material in the present invention, the surface relief-type hologram resin composition of the present invention can be used as a hologram layer to form an image.

As the resin material used in the present invention, thermosetting resin, thermoplastic resin, ionization radiation curing resin etc. can be used.

The thermosetting resin includes unsaturated polyester resin, acryl urethane resin, epoxy modified acrylic resin, epoxy modified unsaturated polyester resin, alkyd resin, phenol resin etc.

The thermoplastic resin includes acrylate resin, acrylamide resin, nitrocellulose resin, polystyrene resin etc.

The above-mentioned resin material may be used as a homopolymer or a copolymer of two or more thereof.

The ionization radiation curing resin includes epoxy polyacrylate resin, urethane acrylate resin, acryl modified polyester resin, the urethane modified acrylate resin described in JP-A 2000-272295, etc.

The resin material used in the present invention may be contained in the range of 10 to 90 wt %, preferably in the range of 25 to 85 wt %, based on the surface relief-type hologram resin composition.

2. Additives

In the present invention, the thermoplastic resin or ionization radiation curing resin described above can be compounded with a thermosetting agent or a UV curing agent. The thermosetting agent or UV curing agent includes isocyanate resin, metallic soap benzoyl peroxides such as cobalt naphthenate and zinc naphthenate, peroxides such as methyl ethyl ketone peroxide etc., and benzophenone, acetophenone, anthraquinone, naphthoquinone, azobisisobutyronitrile, diphenyl sulfide etc.

In the present invention, the following monofunctional or multifunctional monomers, oligomers and polymers can be contained in the ionization radiation curing resin described above, for the purpose of regulating the crosslinked structure, viscosity, etc.

The monofunctional monomers and oligomers include mono(meth)acrylates such as tetrahydrofurfuryl (meth)acrylate, hydroxyethyl (meth)acrylate, vinyl pyrrolidone, (meth)acryloyloxyethyl succinate and (meth) acryloyloxyethyl phthalate.

The multifunctional monomers oligomers and polymers when classified according to their skeleton structure include polyol (meth)acrylates (epoxy modified polyol (meth)acrylate, lactone modified polyol (meth)acrylate etc.), polyester (meth)acrylate, epoxy (meth)acrylate, urethane (meth)acrylate, and poly(meth)acrylates having a skeleton based on polybutadiene, isocyanurate, hydantoin, melamine, phosphate, imide or phosphazene, and use can be made of various kinds of UV- or electron ray-curing monomers, oligomers and polymers.

Specifically, the bifunctional monomers and oligomers can include polyethylene glycol di(meth)acrylate, polypropylene glycol di(meth)acrylate, neopentyl glycol di(meth)acrylate, 1,6-hexane diol di(meth)acrylate, etc. The trifunctional monomers and oligomers include trimethylol propane tri(meth)acrylate, pentaerythritol tri(meth)acrylate, aliphatic tri(meth)acrylate, etc. The tetrafunctional monomers and oligomers can include pentaerythritol tetra(meth)acrylate, ditrimethylol propane tetra(meth)acrylate, aliphatic tetra(meth)acrylate, etc. Further, the pentafunctional or more multifunctional monomers and oligomers can include dipentaerythritol penta(meth)acrylate, dipentaerythritol hexa(meth)acrylate, and (meth)acrylates having a polyester skeleton, an urethane skeleton or a phosphazene skeleton.

The number of functional groups in the monofunctional or multifunctional monomer or oligomer is not particularly limited, but is preferably 3 to 20. This is because when the number of functional groups is less than 3, the heat resistance tends to be decreased, while when the number of functional groups is greater than 20, the flexibility tends to be decreased.

When the surface relief-type hologram is formed, a prestamper having an embossed surface is contact-bonded to the surface relief-type hologram resin composition having the resin material, the fine particles etc., whereby the surface of the surface relief-type hologram resin composition is embossed. In the present invention, a release agent can be added such that the surface relief-type hologram resin composition can be easily released from the pre-stamper. As the release agent, a generally used release agent, for example solid wax such as polyethylene wax, amide wax or Teflon® powder, a fluorine- or phosphate-based surfactant, silicone or the like can be used. Particularly, modified silicone is preferably used as the release agent.

The modified silicone can include (1) modified silicone oil, side chain type, (2) modified silicone oil, both-terminal type, (3) modified silicone oil, one-terminal type, (4) modified silicone oil, side chain and both-terminal type, (5) trimethyl siloxysilicic acid-containing methyl polysiloxane (called silicone resin), (6) silicone graft acrylic resin, and (7) methyl phenyl silicone oil.

The modified silicone oil is divided into reactive silicone oil and non-reactive silicone oil. The reactive silicone oil includes aminomodified, epoxymodified, carboxyl group modified, carbinol modified, methacryl modified, mercapto-modified, phenol modified, one-terminal reactive, or heterogeneous functional group modified silicone oils. On one hand, the non-reactive silicone oil includes polyether modified, methyl styryl modified, alkyl modified, higher aliphatic ester modified, hydrophilic special modified, higher alkoxy modified, higher fatty acid modified, or fluorine modified silicone oils.

Among the modified silicone oils described above, reactive silicone oil having a group reactive with the surface relief-type hologram resin composition reacts with, and binds to, the surface relief-type hologram resin composition under curing, and thus the silicon oil can confer distinctive performance without bleeding out on the surface of the surface relief-type hologram resin composition having an embossed pattern formed later thereon. The silicone oil is effective particularly in improving adhesion of the resin composition to a layer formed by vapor deposition, such as a reflective layer.

B. Hologram Layer

Now, the hologram layer of the present invention is described.

The hologram layer of the present invention is characterized in that it is formed by using the volume-type hologram resin composition or the surface relief-type hologram resin composition.

According to the present invention, the hologram layer is formed by using the volume-type hologram resin composition or the surface relief-type hologram resin composition, and can thus serve as a hologram layer having a high effect of preventing forgery and excellent in foil cutting.

The hologram layer of the present invention can be divided into a volume-type hologram layer formed by using the volume-type hologram resin composition and a surface relief-type hologram layer formed by using the surface relief-type hologram resin composition. Hereinafter, the volume-type hologram layer and the surface relief-type hologram layer are described respectively.

1. Volume-Type Hologram Layer

The volume-type hologram layer of the present invention is formed by using the volume-type hologram resin composition described above. According to the present invention, the volume-type hologram resin composition comprises the predetermined fine particles thereby giving a volume-type hologram layer having a high effect of preventing forgery and excellent in foil cutting.

A description of the volume-type hologram resin composition is omitted because it is the same as "A. Volume-type hologram resin composition" supra.

In the present invention, formation of the volume-type hologram layer is carried out by applying the volume-type hologram resin composition onto e.g. an objective substrate film by a general coating methods and if necessary drying it to form a volume-type hologram forming layer. The volume-type hologram forming layer may be formed for example by injecting the volume-type hologram resin composition into between two substrates such as glass plates. Then, the volume-type hologram-forming layer is exposed to a laser light used usually in a holographic light exposure unit or to a light excellent in coherence (for example a light having a wavelength of 300 to 1200 nm) thereby polymerizing the photopolymerizable compound to record an interference fringes of an objective image. The volume-type hologram layer is thereby formed.

If necessary, a solvent may be used in application of the volume-type hologram resin composition. As the solvent, it is possible to use, for example, acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol etc. These solvents may be used alone or as a mixture of two or more thereof.

The method of applying the volume-type hologram resin composition can be carried out by using a spin coater, a gravure coater, a comma coater, a bar coater or the like.

The amount of the volume-type hologram resin composition applied is selected suitably depending on applications and type of the volume-type hologram layer, but is usually in the range of 1 to 100 g/m$^2$, preferably 10 to 40 g/m$^2$, and the thickness of the volume-type hologram-forming layer is usually in the range of 1 to 100 µm, preferably 10 to 40 µm. The thickness of the volume-type hologram layer formed by curing the volume-type hologram resin composition is preferably in the range of 1 to 100 µm, particularly 10 to 40 µm.

In the present invention, the volume-type hologram-forming layer is exposed to a laser light used usually in a holographic exposure unit or to a light excellent in coherence (for example a light having a wavelength of 300 to 1200 nm) thereby polymerizing the photopolymerizable compound to record an interference fringes of an objective image, as described above. As the laser light, it is possible to use, for example, a visible laser, for example an argon ion laser (458 nm, 488 nm, 514.5 nm), a krypton ion layer (647.1 nm), a helium/neon laser (633 nm), YAG laser (532 nm), etc.

As the method of recording an interference fringes of an image, a conventional method can be used. For example, an original plate is stuck onto the volume-type hologram-forming layer, followed by exposing the substrate film to an interference light such as a visible light or an ionization radiation such as UV light or electron ray to record an interference fringes of an image.

For promotion of refractive index modulation or for completion of the polymerization reaction of the photopolymerizable compound etc., the exposure to an interference light can be followed if necessary by treatment such as heating or exposure of the whole surface to an UV light.

The glass transition temperature of the volume-type hologram layer in the present invention is preferably 100° C. or more, particularly 110° C. or more. When the glass transition temperature of the volume-type hologram layer is in the range described above, the volume-type hologram layer can be stable even upon heating, and can be transferred for example by thermal transfer.

The glass transition temperature in the present invention is a value determined under the following conditions by a solid viscoelasticity analyzer RSA-II manufactured by Rheometric Scientific, Inc. The dynamic storage elastic modulus (E') and dynamic loss elastic modulus (E") were measured, and a peak temperature in loss tangent defined as E"/E' was indicated as glass transition temperature.

(Measurement Conditions)
Sample shape: film (film thickness 20 µm or more)
Measurement mode: film tensile mode
Measurement frequency: 1 Hz
Measurement temperature range: −50 to 150° C.
Heating rate: 5° C./min.

2. Surface Relief-Type Hologram Layer

Now, the surface relief-type hologram layer of the present invention is described. The surface relief-type hologram layer of the present invention is formed by using the surface relief-type hologram resin composition described above. According to the present invention, the surface relief-type hologram resin composition comprises the predetermined fine particles thereby giving a surface relief-type hologram layer having a high effect of preventing forgery and excellent in foil cutting.

A description of the surface relief-type hologram resin composition is omitted because it is the same as described in "B. Surface relief-type hologram resin composition" supra.

In the present invention, formation of the surface relief-type hologram layer is carried out for example by applying the surface relief-type hologram resin composition onto an objective substrate film by a general coating methods and if necessary drying it to form a surface relief-type hologram forming layer. The surface relief-type hologram forming layer may be formed for example by injecting the surface relief-type hologram resin composition into between two substrates such as glass plates. Then, a pre-stamper produced for example from a master hologram having an embossed pattern formed thereon is contact-bonded to the surface relief-type hologram-forming layer, to form the embossed pattern on the surface of the surface relief-type hologram-forming layer, to record an image. The surface relief-type hologram-forming layer is cured to form a surface relief-type hologram layer.

If necessary, a solvent may be used in application of the surface relief-type hologram resin composition. As the solvent, it is possible to use, for example, acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol etc. These solvents may be used alone or as a mixture of two or more thereof.

The method of applying the surface relief-type hologram resin composition can be carried out by using a spin coater, a gravure coater, a comma coater, a bar coater or the like.

The amount of the surface relief-type hologram resin composition applied is selected suitably depending on applications and type of the surface relief-type hologram layer, but is usually in the range of 1 to 100 g/m$^2$, and the thickness of the surface relief-type hologram-forming layer is usually in the range of 0.2 to 100 μm, particularly 1 to 20 μm. The thickness of the surface relief-type hologram layer formed by curing the surface relief-type hologram resin composition is preferably in the range of 0.2 to 100 μm, particularly 1 to 20 μm.

As described above, a pre-stamper produced for example from a master hologram having an embossed pattern formed thereon is contact-bonded to the surface relief-type hologram-forming layer to form the embossed pattern on the surface of the surface relief-type hologram-forming layer to record an image. As the method of recording an image, a general method can be used. For example, an embossing method can be used wherein a surface relief-type master plate comprising a fine embossed pattern having specific information is produced by an optical projection system, then a nickel press plate reproduced from the master plate is used, and this press plate is heated and pressed against the surface relief-type hologram-forming layer thereby reproducing the embossed pattern.

In preparing the master plate, an objective embossed pattern is recorded by exposure to a laser light used usually in a holographic exposure unit or to a light excellent in coherence (for example a light having a wavelength of 300 to 1200 nm). As the laser light, it is possible to use, for example, a visible laser, for example an argon ion laser (458 nm, 488 nm, 514.5 nm), a krypton ion layer (647.1 nm), a helium/neon laser (633 nm), YAG laser (532 nm), etc.

When the surface relief-type hologram layer contains an ionization radiation curing resin, an ionization radiation such as UV light can be applied for curing during and/or after embossing in order to maintain the embossed shape.

The glass transition temperature of the surface relief-type hologram layer in the present invention is preferably 100° C. or more. This is because when the glass transition temperature is in this range, the surface relief-type hologram layer can be stable even upon heating, and can be transferred for example by thermal transfer.

D. Hologram Transfer Foil

Now, the hologram transfer foil of the present invention is described.

The hologram transfer foil of the present invention uses the above-described hologram layer, characterized by having a substrate film, the hologram layer formed on the substrate film, and a heat-sensitive adhesive layer formed on the hologram layer.

According to the present invention, the hologram transfer foil has the hologram layer described above, and as described above, the hologram layer contains the fine particles showing magnetic resonance, and can thus used to easily judge an imitation and a forgery to improve the effect of preventing forgery. There is also an advantage that by incorporation of the fine particles into the hologram layer, the hologram layer is endowed with fragility to improve foil cutting upon adhesion of the hologram to an adherend. In the present invention, a hologram transfer foil having a high effect of preventing forgery and excellent in foil cutting can be obtained and used in various applications.

As shown in FIG. 1, the hologram transfer foil of the present invention has a substrate film 1, a hologram layer 2 formed on the substrate film 1, and a heat-sensitive adhesive layer 3 formed on the hologram layer 2.

By contacting the heat-sensitive adhesive with an adherend and heating the substrate film, the hologram layer can be contact-bonded via the heat-sensitive adhesive to the adherend, and in this state, the hologram transfer foil of the present invention can transfer the hologram layer onto the adherend. Because the hologram transfer foil of the present invention has the hologram layer excellent in foil cutting, only an intended part of the hologram layer can be transferred to the adherend and used in various applications.

Figure 2:
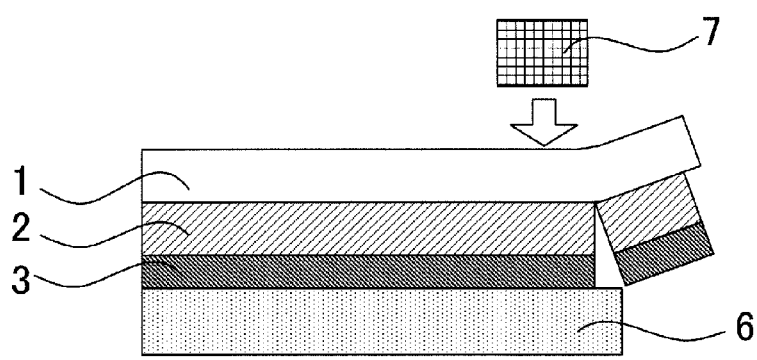
FIG. 2 is a schematic sectional view showing one example of transfer of the hologram transfer foil of the present invention.

As shown in FIG. 2, such transfer can be carried out by overlaying a heat-sensitive adhesive layer 3 so as to contact with the surface of an adherend 6 onto which the hologram is to be transferred, then heating and pressurizing, by e.g. a metal mold 7 capable of heating, a portion onto which the hologram is to be transferred from the substrate film 1, thus melting the heat-sensitive adhesive layer 3 and allowing it to adhere to the adherend, and releasing the substrate film 1 therefrom.

The hologram layer is the same as described in "C. Hologram layer" supra, and thus its description is omitted. Hereinafter, other constitution of the hologram transfer foil is described.

1. Substrate Film

The substrate film used in the present invention is a film wherein the hologram layer is formed, and upon transfer of the hologram layer to an adherend, thermal transfer starts from the side of the substrate film. The substrate film used in the present invention is not particularly limited insofar as it can form a hologram layer and has resistance to heat or pressure applied upon thermal transfer. For example, transparent resin films such as polyethylene film, polypropylene film, polyethylene fluoride-based film, polyvinylidene fluoride film, polyvinyl chloride film, polyvinylidene chloride film, ethylene/vinyl alcohol copolymer film, polyvinyl alcohol film, polymethyl methacrylate film, polyether sulfone film, polyether ether ketone film, polyamide film, tetrafluoroethylene/perfluoroalkyl vinyl ether copolymer film, polyester film such as polyethylene terephthalate film, and polyimide film can be used.

The thickness of the substrate film is selected depending on applications, type etc. of the hologram transfer foil, but is usually in the range of 2 to 200 μm preferably 10 to 50 μm.

2. Heat-Sensitive Adhesive Layer

Now, the heat-sensitive adhesive layer used in the present invention is described. The heat-sensitive adhesive layer used in the present invention is a layer formed on an opposite side to the side of the hologram transfer foil on which the substrate film is formed, and the heat-sensitive adhesive layer is a layer for allowing the hologram layer to adhere to an adherend for example by heating upon transferring the hologram layer to the adherend by thermal transfer.

As the heat-sensitive adhesive layer, it is possible to use, for example, thermoplastic resins such as ethylene/vinyl acetate copolymer resin (EVA), polyamide resin, polyester resin, polyethylene resin, ethylene/isobutyl acrylate copolymer resin, butyral resin, polyvinyl acetate and its copolymer resin, cellulose-based resin, polymethyl methacrylate resin, polyvinyl ether-based resin, polyurethane resin, polycarbonate resin, polypropylene resin, epoxy resin, phenol resin, styrene/butadiene/styrene block copolymer (SBS), styrene/isoprene/ styrene block copolymer (SIS), styrene/ethylene/butylene/ styrene block copolymer (SEBS), and styrene/ethylene/ propylene/styrene block copolymer (SEPS). Among the resins described above, it is preferably a layer capable of heat sealing at a temperature of 180° C. or less, and ethylene/vinyl acetate copolymer resin (EVA) having an acetate content of 25% or more is more preferably used. If necessary, the heat-sensitive adhesive layer can be colored.

3. Hologram Transfer Foil

Figure 3:
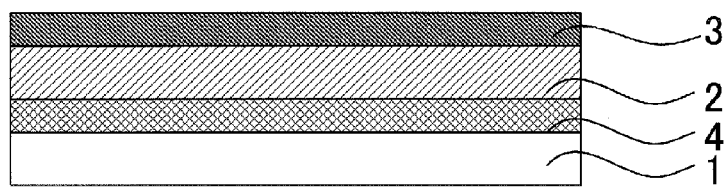
FIG. 3 is a schematic sectional view showing another example of the hologram transfer foil of the present invention.
Figure 4:
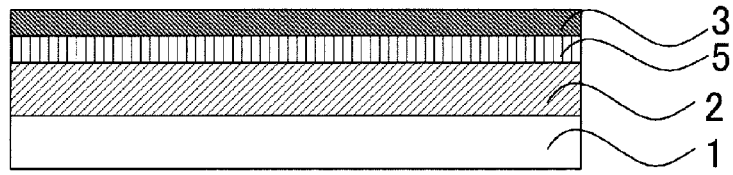
FIG. 4 is a schematic sectional view showing another example of the hologram transfer foil of the present invention.

Now, the hologram transfer foil of the present invention is described. The hologram transfer foil of the present invention are not particularly limited insofar as the hologram layer is formed on the substrate film, and the heat-sensitive adhesive layer is formed on the hologram layer. The hologram transfer foil of the present invention may have a layer other than the layers described above, and may have for example a substrate film 1, a release layer 4 formed on the substrate film 1, a hologram layer 2 formed on the release layer 4, and a heat-sensitive adhesive layer 3 formed on the hologram layer 2, as shown in FIG. 3. As shown in FIG. 4, the hologram transfer foil may have a substrate film 1, a hologram layer 2 formed on the substrate film 1, a reflective layer 5 formed on the hologram 2, and a heat-sensitive adhesive layer 3 formed on the reflective layer 5.

The release layer used in the present invention is a layer arranged for easily releasing the hologram layer from the substrate film in order to transfer the hologram layer from the hologram transfer foil to an adherend. As the release layer, it is possible to use, for example, one member selected from acrylic resin, vinyl chloride/vinyl acetate copolymer resin, polyester resin, polymethacrylate resin, polyvinyl chloride resin, cellulose resin, silicone resin, chlorinated rubber, casein, various kinds of surfactants and metal oxides, or a mixture of two or more thereof. Among the resins described above, only acrylic resin having a molecular weight of about 20,000 to 100,000, or a composition consisting of acrylic resin, vinyl chloride/vinyl acetate copolymer resin having a molecular weight of 8,000 to 20,000 and 1 to 5 wt % polyester resin having a molecular weight of 1,000 to 5,000 as an additional additive, is more preferably used.

The release layer is preferably a layer having a peel strength of 1 to 5 g/inch (90° release) between the substrate film and the hologram layer. The thickness of the release layer is preferably in the range of 0.1 to 2 μm from the viewpoint of peel strength, foil cutting etc.

The reflective layer used in the present invention is formed between the heat-sensitive adhesive layer and the hologram layer, and when a light-reflecting film, for example a metal film is used as the reflective layer, an opaque hologram is obtained, while when a transparent substance different in refractive index from the hologram layer is used, a transparent hologram is obtained, and both the holograms can be used in the present invention. Such reflective layer can be formed by known methods such as sublimation, vacuum deposition, sputtering, reactive spattering, ion plating, and electroplating.

The metal film forming an opaque hologram is for example a film formed from one member selected from Cr, Ti, Fe, Co, Ni, Cu, Ag, Au, Ge, Al, Mg, Sb, Pb, Pd, Cd, Bi, Sn, Se, In, Ga and Rb, oxides thereof, and nitrides thereof, or a mixture of two or more thereof. Among the metal films described above, a metal of Al, Cr, Ni, Ag or Au is particularly preferable, and the thickness of the film is preferably in the range of 1 to 10,000 nm, particularly 20 to 200 nm.

On one hand, the film forming a transparent hologram may use any material insofar as it is light-permeable to exhibit a hologram effect. Such material is for example a transparent material different in refractive index from that of the resin contained in the hologram resin composition. The refractive index in this case may be higher or lower than that of the resin contained in the hologram resin composition, and the difference in refractive index is preferably 0.1 or more, more preferably 0.5 or more, most preferably 1.0 or more. In addition to the film described above, a metallic reflective film of 20 nm or less can be mentioned, and a preferably used transparent reflective layer includes titanium oxide ($TiO_2$), zinc sulfide (ZnS), Cu.Al composite metal oxide, etc.

In the present invention, a barrier layer may be arranged between the release layer and the hologram layer and/or between the hologram layer and the heat-sensitive adhesive layer. Depending on the combination of the hologram resin composition, the release layer and the heat-sensitive adhesive layer used in the present invention, a low-molecular component is transferred with time from the hologram layer to another layer, which may cause transfer of a peak wavelength of a recorded hologram toward the blue side (side of shorter wavelength), and when a low-molecular component is transferred to e.g. the release layer, the releasability may be changed. In the present invention, the barrier layer can be arranged to eliminate such an inhibitory factor.

The material used in the barrier layer is not particularly limited insofar as it is a material showing barrier properties, but usually a transparent organic resin material can be used to achieve the object. In particular, solvent-free trifunctional or more, preferably hexafunctional or more, ionization radiation-curing epoxy modified acrylate resin, urethane modified acrylate resin, acrylic modified polyester resin etc. which react with ionization radiations such as UV light and electron light can be used. In particular, the urethane modified acrylate resin is used preferably for higher barrier properties.

These ionization radiation curing resins are preferably those having a molecular weight of 500 to 2000 in consideration of coating suitability and the hardness of the finally obtained barrier layer, etc. A coating of the barrier layer is basically solvent-free, and can thus be laminated and formed on any layers such as the hologram layer, the release layer and the heat-sensitive adhesive layer.

In the present invention, when the adhesiveness of each layer is low, an adhesion-improving layer etc. can be formed.

The hologram transfer foil of the present invention may be produced by laminating the substrate film, the hologram layer, and the heat-sensitive adhesive layer on this order, or may be produced by preparing the respective members in independent processes and laminating them.

For example, a method wherein the hologram layer having an image formed thereon, the substrate film having a release layer formed thereon, and the heat-sensitive adhesive layer are prepared and then laminated can be used. When the respective members are prepared in independent processes, the release layer etc. can be formed on the substrate film by a dry process or the like, and various materials can be used to form the hologram transfer foil preferable in respect of the efficiency of production.

For example, the hologram layer may be formed on the substrate film (on which the release layer may be formed) and then laminated with a prepared member having an image recorded on the hologram layer and with the heat-sensitive adhesive layer. For example, when the hologram layer is a volume-type hologram layer, the volume-type hologram resin composition is applied onto a substrate and then irradiated with a laser etc. thereby polymerizing the radical polymerizable compound to record an image, and laminated on the substrate film. Thereafter, the whole surface of the applied volume-type hologram resin composition is irradiated with a laser etc., whereby a member comprising the substrate film laminated with the hologram layer having an image recorded thereon is formed. Subsequently, the substrate is released, and the heat-sensitive adhesive is laminated under heating at 100 to 180° C.

The hologram laminate described above can be applied to e.g. plastic cards, cellular phones, notes, daily necessities or CD-ROM packages.

A method of regulating the interlaminar adhesion between the substrate film and the volume-type hologram layer can also be used. That is, it is preferable that when a release layer is present in the layer structure of the hologram transfer foil of the present invention, the relative relationship among the interlaminar adhesion A between the release layer and the substrate film, the interlaminar adhesion B between the release layer and the hologram layer, and the interlaminar adhesion C between the hologram layer and the heat-sensitive adhesive layer, and the B value, satisfy the following relationship:

Interlaminar adhesion: C≥B>A
B value: 600 gf/inch

The hologram transfer foil of the present invention can be used in credit cards or prepaid cards by transferring it to plastic cards or can be used in gift certificates, gift coupons, certificates, passports and tickets by transferring it to various printed matters.

E. Fragile Hologram Label

Now, the fragile hologram label of the present invention is described. The fragile hologram label of the present invention uses the hologram layer described above, characterized by having an adhesive layer, the hologram layer formed on the adhesive layer, and a surface protective layer formed on the hologram layer.

According to the present invention, the fragile hologram label has the hologram layer described above, and as described above, the hologram layer contains the fine particles showing magnetic resonance, and can thus used to easily judge an imitation and a forgery to improve the effect of preventing forgery. By incorporation of the fine particles into the hologram layer, the hologram layer is endowed with fragility, thus making peeling very difficult due to easy cutting upon peeling off the label from the adherent. In the present invention, a hardly releasable fragile hologram label having a high effect of preventing forgery can be obtained and used in various applications.

Figure 9:
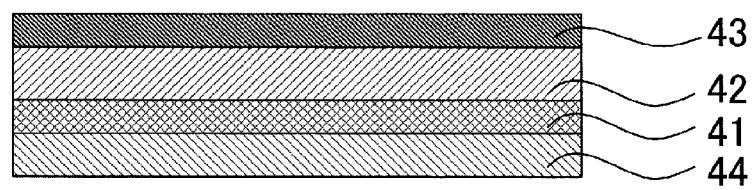
FIG. 9 is a schematic sectional view showing one example of the fragile hologram label of the present invention.

FIG. 9 shows one example of the fragile hologram label of the present invention. As shown in FIG. 9, the fragile hologram label of the present invention is a label wherein a hologram layer 42 is formed on an adhesive layer 41, and a surface protective layer 43 is formed on the hologram layer 42, and if necessary, a release film 44 is stuck onto the surface of the adhesive layer 41 on which the hologram layer 42 is not formed.

Figure 10:
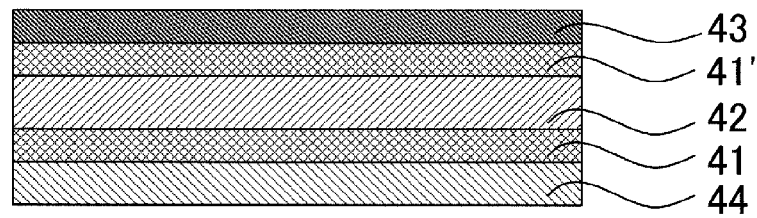
FIG. 10 is a schematic sectional view showing another example of the fragile hologram label of the present invention.

FIG. 10 shows another example of the fragile hologram label of the present invention, and a hologram layer 42 is formed on an adhesive layer 41 stuck onto a release film 44, and an adhesive 41' is formed on the hologram layer 42, and a surface protective layer 43 is formed on the adhesive layer 41'.

The fragile hologram label of the present invention can be stuck onto various kinds of adherend by releasing the release film and contact-bonding the adhesive layer onto the adherend. Accordingly, the hologram layer can be easily arranged on the adherend, and the hologram layer has fragility, and thus there is an advantage that the hologram layer is hardly released from the adherend. Whether the adherend is authentic or not can be easily judged, and thus the effect of preventing forgery can be improved.

When the adhesive layer in the fragile hologram label of the present invention is a heat sealing layer, the release film is not necessary, and when an pressure-sensitive adhesive is used in the adhesive layer, the release film is usually stuck and used on the adhesive layer as shown in FIGS. 9 and 10.

The hologram layer is the same as described in "C. Hologram layer" supra, and thus its description is omitted. Hereinafter, other constitution of the fragile hologram label is described.

1. Adhesive Agent

The adhesive constituting the adhesive layer used in the present invention may be a heat-sensitive adhesive (i.e. a heat sealing agent) or a general pressure-sensitive adhesive.

As the heat sealing agent, the one described in "2. Heat-sensitive adhesive layer" in "D. Hologram transfer foil" supra can be used. As the pressure-sensitive adhesive, an adhesive used usually in such a label can be used.

Specifically, an acrylic adhesive, a rubber-based adhesive, a silicone-based adhesive, an urethane-based adhesive or a polyester-based adhesive can be used. Among these adhesives, an inexpensive acrylic adhesive excellent in durability and adhesiveness is preferably used. The adhesive for forming the adhesive layer may be a solvent-containing adhesive or a solvent-free adhesive. As the solvent-free adhesive, a photosensitive adhesive can be used.

The acrylic adhesive is based on an acrylic pressure-sensitive resin to which a crosslinking agent, a tackifier agent etc. are added if necessary. The acrylic pressure-sensitive resin is based on acrylic copolymer resin obtained by copolymerizing an alkyl acrylate with another monomer and a functional monomer.

The alkyl acrylate is an acrylate having a C4 to C15 alkyl group, and such alkyl acrylate includes, for example, n-butyl acrylate, 2-ethylhexyl acrylate, isooctyl acrylate, isononyl acrylate etc. These alkyl acrylates may be used alone or as a mixture of two or more thereof.

The other monomer includes, for example, methyl acrylate, methyl methacrylate, styrene, acrylonitrile, vinyl acetate etc. These other monomers may be used alone or as a mixture of two or more thereof.

The functional monomer includes, for example, acrylic acid, methacrylic acid, itaconic acid, hydroxyethyl acrylate, hydroxyethyl methacrylate, propylene glycol acrylate, acrylamide, methacrylamide, glycidyl acrylate, glycidyl methacrylate, dimethylaminoethyl methacrylate, tert-butylaminoethyl methacrylate etc. These functional monomers may be used alone or as a mixture of two or more thereof.

The proportion (wt %) of the alkyl acrylate, the other monomer and the functional monomer in the acrylic copolymer resin is 70 to 99: 0 to 20: 0.01 to 20, preferably 80 to 95: 0 to 10: 0.1 to 15. The weight-average molecular weight of the acrylic copolymer resin is preferably 200,000 to 1,200,000, more preferably 400,000 to 1,000,000.

A crosslinking agent is added for improving the cohesive force of the adhesive layer, and such crosslinking agent includes a room-temperature-crosslinking agent and a thermally crosslinking agent.

The room-temperature-crosslinking agent is a crosslinking agent crosslinking the acrylic adhesive by aging at room temperature. The room-temperature-crosslinking agent includes crosslinking agents using isocyanate compounds, multifunctional epoxy compounds, or metal (aluminum, titanium etc.) chelate compounds, among which the isocyanate compounds or multifunctional epoxy compounds are preferably used.

The isocyanate compounds include polyisocyanate compounds, polyisocyanate compound trimers, urethane polymers having an isocyanate group at the terminal thereof obtained by reacting a polyisocyanate compound with a polyol compound, or trimers of such urethane prepolymer. Specific examples of the polyisocyanate compounds include 2,4-tolylene diisocyanate, 2,5-tolylene diisocyanate, 1,3-xylene diisocyanate, 1,4-xylylene diisocyanate, diphenylmethane-4,4'-diisocyanate, 3-methyl diphenyl methane diisocyanate, hexamethylene diisocyanate, isophorone diisocyanate, dicyclohexyl methane-4,4'-diisocyanate, dicyclohexyl methane-2,4'-diisocyanate, lysine isocyanate, etc.

The above compounds used in the room-temperature-crosslinking agent may be used alone or as a mixture of two or more thereof.

The thermally crosslinking agent is a crosslinking agent for crosslinking the acrylic adhesive by aging under heating. Such thermally crosslinking agent includes methylol group-containing compounds obtained by reacting formaldehyde with melamine, benzoguanamine or urea, or methylol group-containing compounds whose methylol groups are partially or wholly etherified by fatty alcohols.

The room-temperature-crosslinking agent may be added in an amount of 0.005 to 20 parts by weight, particularly 0.01 to 10 parts by weight, based on 100 parts by weight of the acrylic copolymer resin. The thermally crosslinking agent may be added in an amount of 0.01 to 25 parts by weight, particularly 0.1 to 20 parts by weight, based on 100 parts by weight of the acrylic copolymer resin.

The tackifier agent is added for the purpose of conferring adhesion, tack or viscoelasticity on the adhesive to improve the adhesive performance of the adhesive, and may not be added if unnecessary. The tackifier agent includes, for example, rosin resin, terpene resin, xylene resin etc., and is added in an amount of 50 wt % or less, preferably 40 wt % or less, based on the acrylic adhesive.

Various additives such as an antioxidant, UV absorber etc. may be added to the adhesive in such a range that its performance is not hindered. When the adhesive layer is formed from a photosensitive adhesive which is cured by irradiation with an UV light or a visible light, a polymerization initiator is added. As the polymerization initiator, it is possible to use, for example, acetophenone or derivatives thereof, benzophenone or derivatives thereof, thioxanthone or derivatives thereof, benzoin, benzoin methyl ether, etc. When the adhesive layer is formed from a photosensitive adhesive which is cured by irradiation with an electron ray, a polymerization initiator is not added.

In formation of the adhesive layer, a method that involves dissolving the above material in a solvent for an adhesive layer coating solution and directly applying the coating solution onto the hologram layer, or a method that involves applying the coating solution onto the release film and then laminating it on the hologram layer, can be used. The latter method is preferably used when the hologram layer is not solvent-resistant, or is not heat-resistant in a drying step for solvent removal. In the latter method, the release film can be used directly as release film.

The solvent for the adhesive coating solution includes, for example, acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, isopropanol etc. When the adhesive forming the adhesive layer is a liquid photosensitive adhesive, it can be applied as it is without being dissolved in a solvent.

The coating method can be carried out by using e.g. a die coater, a comma coater, a knife coater, a gravure coater, a roll coater etc. The thickness of the adhesive layer after drying is 4 to 200 μm, preferably 5 to 100 μm.

After application and transfer of the adhesive layer coating solution, an adhesive layer is formed by aging at room temperature when a room-temperature-crosslinking agent is used as the crosslinking agent. When a thermally crosslinking agent is used as the crosslinking gent, the acrylic adhesive is subjected to aging for 1 to 30 minutes at a temperature of 100° C. or more, preferably 130° C. or more in order to form an adhesive layer. When a photosensitive adhesive is used as the adhesive, the adhesive layer is formed by irradiation with an UV light, a visible light or an electron ray.

When the adhesive layer is arranged by a method other than the transfer method, the release film to be stuck onto the adhesive layer is arranged by laminating the release film on the adhesive layer.

2. Surface Protective Layer

The surface protective layer used in the present invention is not particularly limited insofar as it can protect the hologram layer and has such transparency that the hologram layer can be seen. As the material used in the surface protective layer, a material used usually in such a label can be used.

Specifically, the materials in the release layer described in "3. Hologram transfer foil" in "D. Hologram transfer foil" can be used. Various kinds of substrate films described in "1. Substrate film" in "D. Hologram transfer foil" can be used as the surface protective layer of the fragile hologram label, and when there is adhesion between the hologram layer and the substrate film, the surface protective layer can be laminated and used as it is, while when there is no adhesion, the surface protective layer can be laminated via various kinds of adhesives described in the adhesive layer described above.

3. Release Film

In the present invention, when the pressure-sensitive adhesive is used in the adhesive layer as described above, the adhesive layer with a release film stuck thereon is used.

As the release film, a release paper having a release layer formed one side of a paper substrate is preferably used.

As the release film, a release film obtained by subjecting the surface of a polyethylene terephthalate film to release treatment with a release agent such as a fluorine-based release agent or a silicone-based release agent can be used in place of the usually used release paper. Both sides of the film may also be treated with a release agent to prevent blocking caused by the edge of the coated adhesive.

F. Method of Judging Genuineness

Now, whether the volume-type hologram resin composition, the surface relief-type hologram resin composition, the hologram layer, the hologram transfer foil and the fragile hologram label according to the present invention are authentic or not is described.

In the present invention, genuineness can be judged by utilizing a generally used magnetic resonance unit.

Figure 5:
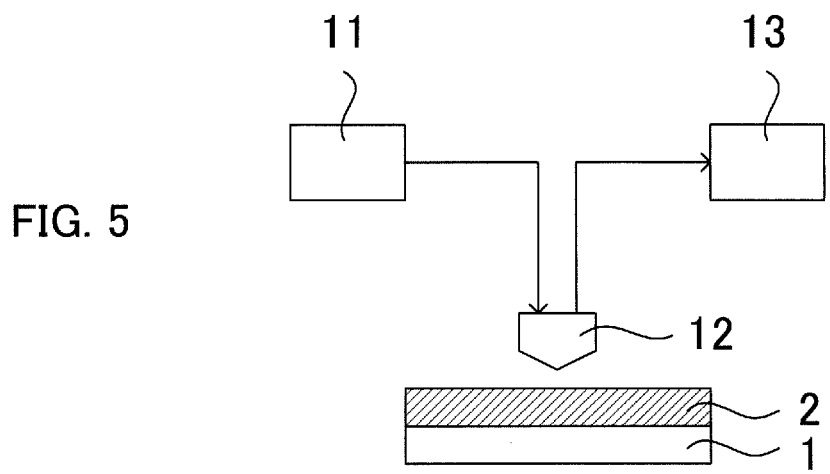
FIG. 5 is a schematic view showing one example of a magnetic resonance unit used in the present invention.

For example, the method of judging whether the hologram layer is authentic or not is described below. FIG. 5 shows one example of the magnetic resonance unit used in the present invention. In FIG. 5, an electromagnetic wave is generated from a high-frequency generator 11, and when the electromagnetic wave of resonant frequency is applied through probe 12 onto a hologram layer 2, the fine particles contained in the hologram layer 2 shows resonance therewith to absorb energy. Then, this absorption energy is detected by the probe 12, and the detected signal is recorded by a recorder 13.

Figure 6A:
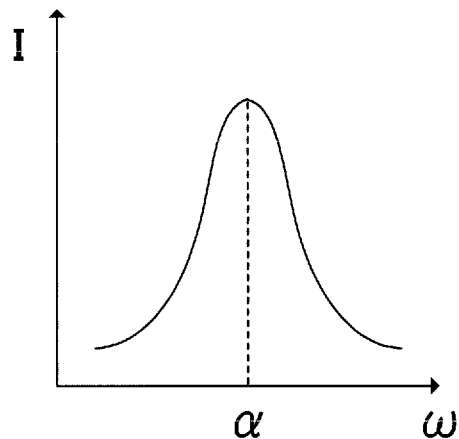
FIG. 6 is a graph showing one example of a magnetic resonance spectrum of the fine particles used in the present invention.
Figure 6B:
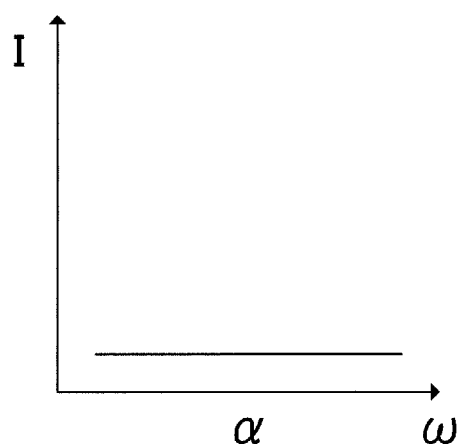

FIG. 6 shows one example of a magnetic resonance spectrum obtained by converting the signal detected by the magnetic resonance unit. FIG. 6A is a magnetic resonance spectrum of a hologram layer containing the fine particles showing magnetic resonance, and FIG. 6B is a magnetic resonance spectrum of a hologram layer not containing the fine particles showing magnetic resonance, wherein I is electromagnetic absorption strength, and ω is frequency. In the hologram layer containing the fine particles showing magnetic resonance having specific resonant frequency α, a spectrum having a peak wherein the electromagnetic absorption strength becomes the maximum at the resonant frequency α is obtained as shown in FIG. 6A. In the hologram layer not containing the fine particles showing magnetic resonance, on the other hand, a spectrum having a peak is not obtained (FIG. 6B). In the present invention, genuineness can be easily judged due to such a difference between spectrums.

Because the resonant frequency varies depending on individual substances, the type of fine particles used can be known by considering a position, strength, half width and shape in the resulting magnetic resonance spectrum. Accordingly, even if fine particles showing magnetic resonance are contained in an imitated hologram layer, a different magnetic resonance spectrum is obtained where the type and content of the fine particles are different from fine particles contained in an authentic hologram layer, and thus genuineness can be judged by comparing the magnetic resonance spectrums.

Whether the volume-type hologram resin composition, the surface relief-type hologram resin composition, the hologram transfer foil and the fragile hologram label according to the present invention are authentic or not can be judged in the same manner as described above.

The present invention is not limited to the embodiments described above. The embodiments are provided for illustrative purposes, and those having substantially the same construction as the technical idea described in the claims of the invention and exhibiting the same working effect as in the present invention are included in the technical scope of the present invention.

EXAMPLES

Hereinafter, the present invention described in more detail by reference to the Examples.

Example 1

First, a volume-type hologram resin composition comprising the following composition was prepared.

| | |
|---|---|
| Polyvinyl acetate resin (weight-average molecular weight 100,000) | 100 parts by weight |
| 2-Phenoxyethyl acrylate | 120 parts by weight |
| 2-Ethoxyethyl acrylate | 120 parts by weight |
| Hexallyl biimidazole | 10 parts by weight |
| 2,5-Bis[4-(diethylamino) phenyl] methylene-cyclopentanone | 1 part by weight |
| Manganese ferrite-based fine particles (average particle diameter 300 nm, resonant frequency at room temperature 536 MHz) | 10 parts by weight |
| 1-Butanol | 100 parts by weight |
| Methyl ethyl ketone | 100 parts by weight |

The above volume-type hologram resin composition was applied onto 50 μm polyethylene terephthalate (PET) film (LUMIRROR T60 manufactured by Toray Industries, Inc.) such that the thickness of the resulting film after drying became 10 μm, to give a volume-type hologram-forming layer. This volume-type hologram-forming layer was stuck onto a mirror original plate and irradiated through the PET film with an argon ion laser light (wavelength 514.5 nm) to record a hologram. After heating and UV ray fixation light exposure, a fixed volume-type hologram layer was formed.

Example 2

A volume-type hologram layer was produced in the same manner as in Example 1 except that the following volume-type hologram resin composition was used.
<Volume-Type Hologram Resin Composition>

| | |
|---|---|
| Polyvinyl acetate (weight-average molecular weight 200,000) | 100 parts by weight |
| 9,9-Bis(4-acryloxydiethoxyphenyl) fluorene | 80 parts by weight |
| 1,6-Hexanediol diglycidyl ether | 70 parts by weight |
| Diphenyl iodonium hexafluoroantimonate | 5 parts by weight |
| 3,9-Diethyl-3'-carboxymethyl-2,2'-thiacarbocyanine iodonium salt | 1 part by weight |
| Manganese ferrite-based fine particles (average particle diameter 300 nm, resonant frequency at room temperature 536 MHz) | 10 parts by weight |
| 1-Butanol | 100 parts by weight |
| Methyl ethyl ketone | 100 parts by weight |

Example 3

A volume-type hologram layer was produced in the same manner as in Example 1 except that the average particle diameter of the manganese ferrite-based fine particles in the volume-type hologram resin composition in Example 1 was changed to 50 nm.

Example 4

A volume-type hologram layer was produced in the same manner as in Example 1 except that the average particle diameter of the manganese ferrite-based fine particles in the volume-type hologram resin composition in Example 1 was changed to 180 nm.

Example 5

A volume-type hologram layer was produced in the same manner as in Example 1 except that the average particle diameter of the manganese ferrite-based fine particles in the volume-type hologram resin composition in Example 1 was changed to 400 nm.

Example 6

A volume-type hologram layer was produced in the same manner as in Example 1 except that polyvinyl acetate in the volume-type hologram resin composition in Example 1 was changed to polymethyl methacrylate.
[Evaluation]

The volume-type hologram layer and the volume-type hologram resin composition obtained in each of Examples 1 to 6 contained the manganese ferrite-based fine particles prepared using the material disclosed in U.S. Pat. No. 5,986,550 owned by Micro Tag Temed Ltd. and could thus used to judge genuineness by utilizing magnetic resonance.

Figure 7:
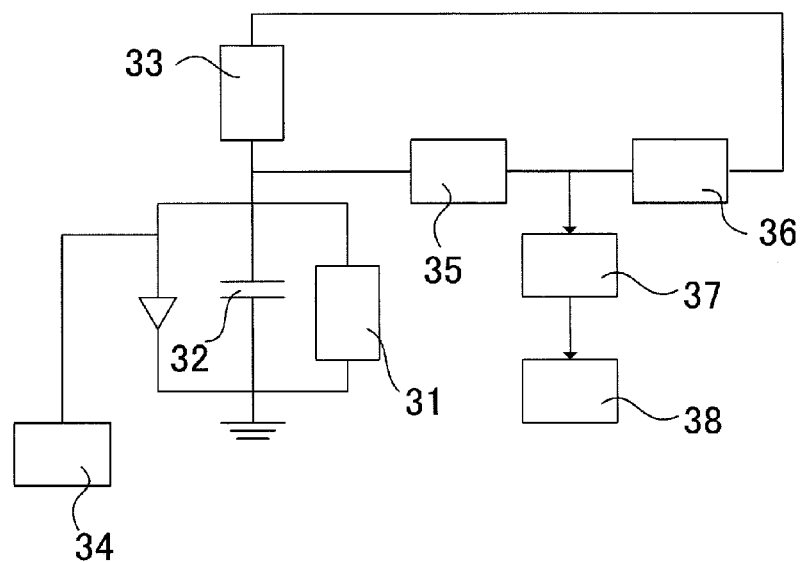
FIG. 7 is a schematic view showing another example of a magnetic resonance unit used in the present invention.
Figure 8:
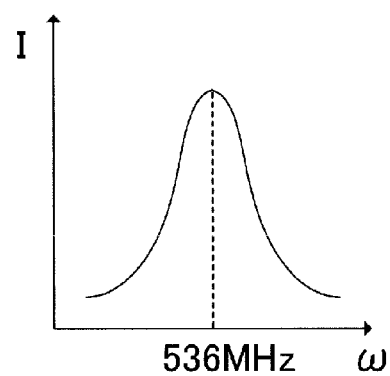
FIG. 8 is a graph showing another example of a magnetic resonance spectrum of the fine particles used in the present invention.

Judgment of genuineness was conducted by using the system shown in FIG. 7 which is disclosed in U.S. Pat. No. 5,986,550 owned by Micro Tag Temed Ltd. In FIG. 7, 31 is a coil (L), 32 is a capacitor (C), 33 is a resistance (R), 34 is a controller for controlling the resonant frequency of an LC circuit, 35 is a linear amplifier acting on a signal at resonant frequency, and 36 is a non-linear amplifier for limiting the intensity of a signal. 37 is a detector, and 38 is a recorder. First, when the hologram resin composition or the hologram layer is allowed to approach the coil 31 of the LC circuit, resonance absorption occurs at the same frequency as the resonant frequency of the manganese ferrite-based fine particles. This phenomenon was recorded by the detector 37 and the recorder 38. A spectrum as shown in FIG. 8 was thereby obtained. In FIG. 8, the frequency at which the electromagnetic absorption strength became the maximum was 536 MHz, and agreed with the resonant frequency of the added manganese ferrite-based fine particles, and thus it could be certified that the hologram resin composition and the hologram layer were authentic.

Example 7

A surface relief-type hologram resin composition comprising the following composition was prepared.

| | |
|---|---|
| Trimethyl siloxy silicic acid-containing methyl polysiloxane | 1 part by weight |
| Trimethylol propane triacrylate | 10 parts by weight |
| Polyester acrylate | 10 parts by weight |
| 2-Methyl-1-[4-(methylthio) phenyl]-2-morpholinopropan-1-one | 5 parts by weight |
| Manganese ferrite-based fine particles (average particle diameter 300 nm, resonant frequency at room temperature 536 MHz) | 10 parts by weight |
| Toluene | 30 parts by weight |
| Methyl ethyl ketone | 30 parts by weight |

The above surface relief-type hologram resin composition was applied onto 50 μm polyethylene terephthalate (PET) film (LUMIRROR T60 manufactured by Toray Industries, Inc.) such that the thickness of the resulting film after drying became 3 μm, to give a surface relief-type hologram-forming layer. This surface relief-type hologram-forming layer was contact-bonded to an embossed stamper of 500 nm pitch, then released from the stamper, and fixed by light exposure to an UV light to form a surface relief-type hologram layer.

Example 8

A surface relief-type hologram layer was produced in the same manner as in Example 7 except that the average particle diameter of the manganese ferrite-based fine particles in the surface relief-type hologram resin composition in Example 7 was changed to 50 nm.

Example 9

A surface relief-type hologram layer was produced in the same manner as in Example 7 except that the average particle diameter of the manganese ferrite-based fine particles in the surface relief-type hologram resin composition in Example 7 was changed to 180 nm.

Example 10

A surface relief-type hologram layer was produced in the same manner as in Example 7 except that the average particle diameter of the manganese ferrite-based fine particles in the surface relief-type hologram resin composition in Example 7 was changed to 400 nm.
[Evaluation]
The surface relief-type hologram layers and the surface relief-type hologram resin compositions obtained in Examples 7 to 10 contained the manganese ferrite-based fine particles disclosed in U.S. Pat. No. 5,986,550 owned by Micro Tag Temed Ltd., and could thus be used to easily judge genuineness by utilizing electromagnetic resonance. Judgment of genuineness was conducted by using the same system as in Example 1.

Comparative Example 1

A volume-type hologram layer was produced in the same manner as in Example 1 except that the fine particles were not added.

Comparative Example 2

A surface relief-type hologram layer was produced in the same manner as in Example 3 except that the fine particles were not added.
[Evaluation]
Whether the hologram layers obtained in Comparative Examples 1 and 2 were authentic or not was judged in the same system as in Example 1. As a result, judgment of the genuineness of both the hologram layers was not feasible.

Comparative Example 3

A volume-type hologram layer was produced in the same manner as in Example 1 except that the average particle diameter of the manganese ferrite-based fine particles in the volume-type hologram resin composition in Example 1 was changed to 600 nm.

Comparative Example 4

A surface relief-type hologram layer was produced in the same manner as in Example 7 except that the average particle diameter of the manganese ferrite-based fine particles in the surface relief-type hologram resin composition in Example 7 was changed to 600 nm.
[Evaluation]
In both Comparative Examples 3 and 4, the average particle diameter of the manganese ferrite-based fine particles used was greater than the hologram recording wavelength (volume-type: 514.5 nm (laser light wavelength), surface relief-type: 500 nm (embossed stamper pitch)), and thus desired image information could not be recorded.

Examples 11 to 13

Using each of the volume-type hologram layers in Examples 1 and 2 or the surface relief-type hologram layer in Example 7, a hologram transfer foil was produced by the following method.
(Production of Release Layer/PET)
A release layer-forming material comprising the following composition was applied onto a PET film of 25 μm in thickness (LUMIRROR T60 manufactured by Toray Industries, Inc.) such that the thickness of the resulting film after drying became 1 μm, to produce a release layer/PET.
<Release Layer-Forming Material>

| | |
|---|---|
| Polymethyl methacrylate (weight-average molecular weight 35,000) | 97 parts by weight |
| Polyethylene wax (weight-average molecular weight 10,000) | 3 parts by weight |
| Polyester (weight-average molecular weight 1500) | 0.3 part by weight |

| Methyl ethyl ketone | 200 parts by weight |
| Toluene | 200 parts by weight |

(Preparation of Heat-Sensitive Adhesive Layer/Release-Treated PET)

The following heat-sensitive adhesive layer-forming material was applied onto a release agent-treated PET film of 38 μm in thickness (SP-PET manufactured by TOHCELLO CO., LTD) such that the thickness of the resulting film after drying became 3 μm, to produce a heat-sensitive adhesive layer/release-treated PET.

<Heat-Sensitive Adhesive Layer-Forming Material>

An ethylene/vinyl acetate copolymer resin solution (AD1790-15 manufactured by Toyo Morton, LTD).

(Preparation of Hologram Transfer Foil)

*In the Case of the Volume-type hologram

A hologram surface removed from a mirror original plate was laminated at 80° C. with the release layer surface of the release layer/PET, to give a laminate consisting of PET/release layer/volume-type hologram layer/PET. Then, the PET laminated on the volume-type hologram layer was released, and the hologram surface was laminated at 130° C. with the heat-sensitive adhesive layer of the heat-sensitive adhesive layer/release-treated PET, and then the release-treated PET was released, whereby a hologram transfer foil consisting of PET/release layer/volume-type hologram layer/heat-sensitive adhesive layer was obtained.

*In the Case of the Surface Relief-type hologram

The surface relief-type hologram resin composition described in Example 7 was applied onto the release layer of the release layer/PET such that the resulting film after drying became 3 to prepare a surface relief-type hologram-forming layer, and this surface relief-type hologram-forming layer was contact-bonded to an embossed stamper of 500 nm pitch. After release from the stamper, the surface relief-type hologram-forming layer was subjected to fixation light exposure to an UV light, and an Al reflective layer was formed by vapor deposition on the embossed surface.

The Al-vapor-deposited surface was laminated at 130° C. with the heat-sensitive adhesive layer of the heat-sensitive adhesive layer/release-treated PET, and then the release-treated PET was removed, whereby a hologram transfer foil consisting of PET/release layer/surface relief-type hologram layer/Al-vapor-deposited layer/heat-sensitive adhesive layer was obtained.

(Evaluation of Transferability)

The surface of the heat-sensitive adhesive layer of the resulting hologram transfer foil was attached to a vinyl chloride card as an adherend, and a hologram was transferred by pressing a mold heated at 150° C. onto the side of PET, and as a result, good transferability was demonstrated in every case.

(Judgment of Genuineness)

After transfer, any adherend had the above hologram layer, and this hologram layer contained the manganese ferrite-based fine particles, and could thus be used to easily judge genuineness by utilizing the electromagnetic resonance phenomenon. Judgment of genuineness was conducted in the same system as in Example 1

Comparative Examples 5 and 6

A hologram transfer foil was prepared in the same manner as in Examples 11 to 13 except that the volume-type hologram layer (with no fine particles added) in Comparative Example 1 or the surface relief-type hologram layer (with no fine particles added) in Comparative Example 2 was used. When transferability was evaluated, an image was denatured due to applied pressure and could not be excellently transferred.

Examples 14 to 16

Using each of the volume-type hologram layers in Examples 1 and 2 or the surface relief-type hologram layer in Example 7, a fragile hologram label was produced by the following method.

(Preparation of Surface Protective Layer/PET)

The release layer/PET in preparing the hologram transfer foil described above was used directly as the surface protective layer/PET.

(Preparation of Adhesive Layer/Release-Treated PET)

The following adhesive layer-forming material was applied onto a release agent-treated PET film of 38 μm in thickness (SP-PET manufactured by TOHCELLO CO., LTD) such that the thickness of the resulting film after drying became 25 μm, to produce an adhesive layer/release-treated PET.

<Adhesive Layer-Forming Material>

| Acrylate-based adhesive resin solution (PE-118 manufactured by NIPPON CARBIDE INDUSTRIES CO., INC.) | 100 parts by weight |
| Isocyanate-based crosslinking agent solution (CK-101 manufactured by NIPPON CARBIDE INDUSTRIES CO., INC.) | 4 parts by weight |
| Methyl ethyl ketone | 20 parts by weight |
| Toluene | 20 parts by weight |

(Production of Fragile Hologram Label)

*In the Case of the Volume-type hologram

A fragile hologram label consisting of PET/surface protective layer/volume-type hologram layer/adhesive layer/release-treated PET was produced in the same manner as in preparation of the above hologram transfer foil except that the adhesive layer of the adhesive layer/release-treated PET was laminated at room temperature in place of the heat-sensitive adhesive layer/release-treated PET.

*In the Case of the Surface Relief-type hologram

A fragile hologram label consisting of PET/surface protective layer/surface relief-type hologram layer/Al-vapor-deposited layer/adhesive layer/release-treated PET was produced in the same manner as in preparation of the above hologram transfer foil except that the adhesive layer of the adhesive layer/release-treated PET was laminated at room temperature in place of the heat-sensitive adhesive layer/release-treated PET.

(Judgment of Genuineness)

Any labels had the above hologram layer, and this hologram layer contained the manganese ferrite-based fine particles, and could thus be used to easily judge genuineness by utilizing the electromagnetic resonance phenomenon. Judgment of genuineness was conducted in the same system as in Example 1.

The release-treated PET was removed, the adhesive layer was stuck onto a vinyl chloride card, and then the surface PET was released, whereby articles having the fragile hologram label stuck thereon were produced. Any articles had the above hologram layer, and this hologram layer contained the manganese ferrite-based fine particles, and could thus be used to easily judge genuineness by utilizing the electromagnetic resonance phenomenon. Judgment of genuineness was conducted in the same system as in Example 1.

What is claimed is:

1. A method of judging genuineness, wherein the method uses a magnetic resonance unit and is conducted to a member comprising a hologram layer the method comprises steps of:
- a step of detecting absorption energy absorbed by the hologram layer when an electromagnetic wave of the predetermined resonant frequency is applied to the hologram layer by utilizing the magnetic resonance unit, and
- a step of judging, based on the absorption energy, whether the hologram layer contains a fine particle showing magnetic resonance having the predetermined resonant frequency; and
- the hologram layer is judged genuine when the hologram layer contains the fine particle showing magnetic resonance having the predetermined resonant frequency, and the hologram layer is judged forgery when the hologram layer does not contain the fine particle showing magnetic resonance having the predetermined resonant frequency.

2. The method of judging genuineness according to claim 1, wherein the fine particle shows nuclear magnetic resonance.

3. The method of judging genuineness according to claim 1, wherein the fine particle shows electron spin resonance.

4. The method of judging genuineness according to claim 1, wherein the hologram layer is a volume-type hologram layer.

5. The method of judging genuineness according to claim 1, wherein the hologram layer is a surface relief-type hologram layer.

6. A method of judging genuineness, wherein the method uses a magnetic resonance unit and is conducted to a volume-type hologram resin composition having at least one kind of photopolymerizable compound, a photopolymerization initiator;

the method comprises steps of:
- a step of detecting absorption energy absorbed by the volume-type hologram resin composition when an electromagnetic wave of the predetermined resonant frequency is applied to the volume-type hologram resin composition by utilizing the magnetic resonance unit, and
- a step of judging, based on the absorption energy, whether the volume-type hologram resin composition contains a fine particle showing magnetic resonance having the predetermined resonant frequency; and
- the volume-type hologram resin composition is judged genuine when the volume-type hologram resin composition contains the fine particle showing magnetic resonance having the predetermined resonant frequency, and the volume-type hologram resin composition is judged forgery when the volume-type hologram resin composition does not contain the fine particle showing magnetic resonance having the predetermined resonant frequency.

7. The method of judging genuineness according to claim 6, wherein the fine particle shows unclear magnetic resonance.

8. The method of judging genuineness according to claim 6, wherein the file particle shows electron spin resonance.

9. A method of judging genuineness, wherein the method uses a magnetic resonance unit and is conducted to a surface relief-type hologram resin composition having a resin material;

the method comprises steps of:
- a step of detecting absorption energy absorbed by the surface relief-type hologram resin composition when an electromagnetic wave of the predetermined resonant frequency is applied to the surface relief-type hologram resin composition by utilizing the magnetic resonance unit, and
- a step of judging, based on the absorption energy, whether the surface relief-type hologram resin composition contains a fine particle showing magnetic resonance haying the predetermined resonant frequency; and
- the surface relief-type hologram resin composition is judged genuine when the surface relief-type hologram resin composition contains the fine particle showing magnetic resonance having the predetermined resonant frequency, and the surface relief-type hologram resin composition is judged forgery when the surface relief-type hologram resin composition does not contain the fine particle showing magnetic resonance haying the predetermined resonant frequency.

10. The method of judging genuineness according to claim 9, wherein the fine particle shows nuclear magnetic resonance.

11. The method of judging genuineness according to claim 9, wherein the fine particle shows electron spin resonance.

* * * * *